United States Patent
Zhou et al.

(10) Patent No.: US 11,617,211 B2
(45) Date of Patent: Mar. 28, 2023

(54) TECHNIQUES FOR RANDOM ACCESS CHANNEL BEAM SWEEPING ACROSS MULTIPLE PHYSICAL CELL IDENTIFIERS OF A SERVING CELL

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US); Xiaoxia Zhang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/198,483

(22) Filed: Mar. 11, 2021

(65) Prior Publication Data
US 2021/0329699 A1 Oct. 21, 2021

Related U.S. Application Data

(60) Provisional application No. 63/013,373, filed on Apr. 21, 2020.

(51) Int. Cl.
*H04W 74/08* (2009.01)
*H04W 72/04* (2009.01)
(Continued)

(52) U.S. Cl.
CPC ........ *H04W 74/0833* (2013.01); *H04B 7/024* (2013.01); *H04B 7/088* (2013.01);
(Continued)

(58) Field of Classification Search
CPC . H04W 74/0833; H04W 12/73; H04W 12/76; H04W 48/08; H04W 48/12;
(Continued)

(56) References Cited

U.S. PATENT DOCUMENTS 11,375,527 B1 * 6/2022 Eyuboglu .......... H04B 7/15528
2012/0207070 A1 * 8/2012 Xu ........................ H04W 48/20
370/311

(Continued)

FOREIGN PATENT DOCUMENTS

WO WO-2020069415 A1 4/2020

OTHER PUBLICATIONS

CATT: "Discussion on Multi-Beam Operation for NR-PDCCH", 3GPP Draft, R1-1712394, 3GPP TSG RAN WG1 Meeting #90, 3rd Generation Partnership Project (3GPP), Mobile Competence Centre, 650, Route Des Lucioles, F-06921 Sophia-Antipolis Cedex, France, vol. RAN WG1.No. Prague, Czechia, Aug. 21, 2017-Aug. 25, 2017, Aug. 20, 2017 (Aug. 20, 2017), XP051315210, pp. 1-5, Retrieved from the Internet: URL:http://www.3gpp.org/ftp/Meetings_3GPP_SYNC/RAN1/Docs/[retrieved on Aug. 20, 2017] paragraph [0002]—paragraph [0003].

(Continued)

*Primary Examiner* — Joshua Kading
(74) *Attorney, Agent, or Firm* — Dalei Dong; Harrity & Harrity, LLP

(57) ABSTRACT

The present disclosure generally relates to wireless communication. In some aspects, a user equipment may receive an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure; transmit one or more first random access messages in one or more corresponding RACH occasions associated with one or more PCIs of the multiple PCIs; and receive one or more second random access messages, that include a physical download control channel portion and a (Continued)

physical download shared channel portion, associated with the one or more PCIs based at least in part on transmitting the one or more first random access messages. Numerous other aspects are provided.

30 Claims, 17 Drawing Sheets

(51) Int. Cl.
| | |
|---|---|
| *H04L 5/00* | (2006.01) |
| *H04W 12/73* | (2021.01) |
| *H04B 7/08* | (2006.01) |
| *H04B 7/024* | (2017.01) |
| *H04L 69/323* | (2022.01) |
| *H04L 61/25* | (2022.01) |
| *H04W 72/12* | (2023.01) |
| *H04W 76/10* | (2018.01) |
| *H04W 48/16* | (2009.01) |
| *H04W 48/08* | (2009.01) |
| *H04W 80/02* | (2009.01) |
| *H04W 48/18* | (2009.01) |

(52) U.S. Cl.
CPC ............ *H04L 5/0048* (2013.01); *H04L 61/25* (2013.01); *H04L 69/323* (2013.01); *H04W 12/73* (2021.01); *H04W 48/08* (2013.01); *H04W 48/16* (2013.01); *H04W 72/042* (2013.01); *H04W 72/1289* (2013.01); *H04W 76/10* (2018.02); *H04W 48/18* (2013.01); *H04W 80/02* (2013.01)

(58) Field of Classification Search
CPC ... H04W 48/16; H04W 48/18; H04W 72/042; H04W 72/121; H04W 72/1289; H04W 76/10; H04W 76/11; H04W 80/02; H04W 8/26; H04B 7/024; H04B 7/088; H04L 5/0048; H04L 61/25; H04L 69/32; H04L 69/323

See application file for complete search history.

(56) References Cited

U.S. PATENT DOCUMENTS

| | | |
|---|---|---|
| 2019/0053272 A1 | 2/2019 | Tsai |
| 2019/0379506 A1 | 12/2019 | Cheng |
| 2020/0059970 A1 | 2/2020 | Islam et al. |
| 2020/0351055 A1* | 11/2020 | Manolakos ........... H04L 5/0023 |
| 2021/0185652 A1* | 6/2021 | Rune ..................... H04L 5/0053 |
| 2022/0104300 A1* | 3/2022 | Ramachandra ....... H04W 76/19 |

OTHER PUBLICATIONS

Huawei, et al., "Physical Layer Aspects for NR Mobility Enhancements", 3GPP Draft, R1-1906056, 3GPP TSG RAN WG1 Meeting #97, 3rd Generation Partnership Project (3GPP), Mobile Competence Centre, 650, Route Des Lucioles, F-06921 Sophia-Antipolis Cedex, France, vol. RAN WG1. No. Reno, USA, May 13, 2019-May 17, 2019, May 13, 2019 (May 13, 2019), XP051727513, Retrieved from the Internet: URL:http://www.3gpp.org/ftp/Meetings%5F3GPP%5FSYNC/RAN1/Docs/R1%2D1906056%2Ezip [retrieved on May 13, 2019] Paragraph [0002], the Whole Document, 12 Pages.

Huawei, et al., "RACH Procedures and Resource Configuration", 3GPP Draft, R1-1701724, 3GPP TSG RAN WG1 Meeting #88, 3rd Generation Partnership Project (3GPP), Mobile Competence Centre, 650, Route Des Lucioles, F-06921 Sophia-Antipolis Cedex, France, vol. RAN WG1. No. Athens, Greece, Feb. 13, 2017-Feb. 17, 2017, Feb. 6, 2017 (Feb. 6, 2017), XP051220589, pp. 1-7, Retrieved from the Internet: URL:http://www.3gpp.org/ftp/tsg_ran/WG1_RL1/TSGR1_88/Docs/ [retrieved on Feb. 6, 2017] Paragraph [0002].

International Search Report and Written Opinion—PCT/US2021/022079—ISA/EPO—dated Jul. 12, 2021.

* cited by examiner

TECHNIQUES FOR RANDOM ACCESS CHANNEL BEAM SWEEPING ACROSS MULTIPLE PHYSICAL CELL IDENTIFIERS OF A SERVING CELL

CROSS-REFERENCE TO RELATED APPLICATION

This patent application claims priority to U.S. Provisional Patent Application No. 63/013,373, filed on Apr. 21, 2020, and entitled "TECHNIQUES FOR RANDOM ACCESS CHANNEL BEAM SWEEPING ACROSS MULTIPLE PHYSICAL CELL IDENTIFIERS OF A SERVING CELL." The disclosure of the prior Application is considered part of and is incorporated by reference into this Patent Application.

FIELD OF THE DISCLOSURE

Aspects of the present disclosure generally relate to wireless communication and to techniques and apparatuses for random access channel (RACH) beam sweeping across multiple physical cell identifiers (PCIs) of a serving cell.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure; transmitting one or more first random access messages in one or more corresponding RACH occasions associated with one or more PCIs of the multiple PCIs; and receiving one or more second random access messages, that include a physical downlink control channel (PDCCH) portion and a physical downlink shared channel (PDSCH) portion, associated with the one or more PCIs based at least in part on transmitting the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is received in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the method may further include monitoring one or more PDCCH occasions for the PDCCH portion of the one or more second random access messages, wherein the one or more PDCCH occasions correspond to a PCI associated with the one or more corresponding RACH occasions in which the one or more first random access message are transmitted.

In some aspects, the method may further include receiving a PDCCH portion of a second random access message of the one or more random access messages based at least in part on monitoring the one or more PDCCH occasions, wherein the PDCCH portion of the second random access message includes scheduling information for at least one of a PDSCH portion of the second random access message, one or more subsequent random access messages, or a combination thereof.

In some aspects, the method may further include receiving a PDCCH portion of a second random access message of the one or more random access messages based at least in part on monitoring the one or more PDCCH occasions, wherein the PDCCH portion of the second random access message indicates a different association between PCIs of the multiple PCIs and at least one of a PDSCH portion of the second random access message, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the method may further include applying a timing advance value received in a second random access message, of the one or more second random access messages, to all PCIs included in a timing advance group that includes a PCI associated with the second random access message.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

In some aspects, a method of wireless communication, performed by a base station, may include transmitting an indication of an association between one or more downlink reference signals and a corresponding PCI of multiple PCIs associated with a serving cell, wherein the one or more downlink reference signals are used to identify one or more beams associated with one or more RACH occasions for a RACH procedure; receiving one or more first random access messages in one or more corresponding RACH occasions associated with one or more PCIs of the multiple PCIs; and transmitting one or more second random access messages, that include a PDCCH portion and a PDSCH portion, associated with the one or more PCIs based at least in part on receiving the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is transmitted in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the method may further include transmitting the PDCCH portion in one or more PDCCH occasions, wherein the one or more PDCCH occasions corresponding to a PCI associated with the one or more corresponding RACH occasions in which the one or more first random access message are received.

In some aspects, the PDCCH portion includes scheduling information for at least one of the PDSCH portion of, one or more subsequent random access messages, or a combination thereof.

In some aspects, the PDCCH portion indicates a different association between PCIs of the multiple PCIs and at least one of the PDSCH portion, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

In some aspects, a UE for wireless communication may include a memory and one or more processors operatively coupled to the memory. The memory and the one or more processors may be configured to receive an indication of an association between one or more downlink reference signals and a corresponding PCI of multiple PCIs associated with a serving cell, wherein the one or more downlink reference signals are used to identify one or more beams associated with one or more RACH occasions for a RACH procedure; transmit one or more first random access messages in one or more corresponding RACH occasions associated with one or more PCIs of the multiple PCIs; and receive one or more second random access messages, that include a PDCCH portion and a PDSCH portion, associated with the one or more PCIs based at least in part on transmitting the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occa-sions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is received in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the one or more processors are further configured to monitor one or more PDCCH occasions for the PDCCH portion of the one or more second random access messages, wherein the one or more PDCCH occasions correspond to a PCI associated with the one or more corresponding RACH occasions in which the one or more first random access message are transmitted.

In some aspects, the one or more processors are further configured to receive a PDCCH portion of a second random access message of the one or more random access messages based at least in part on monitoring the one or more PDCCH occasions, wherein the PDCCH portion of the second random access message includes scheduling information for at least one of a PDSCH portion of the second random access message, one or more subsequent random access messages, or a combination thereof.

In some aspects, the one or more processors are further configured to receive a PDCCH portion of a second random access message of the one or more random access messages based at least in part on monitoring the one or more PDCCH occasions, wherein the PDCCH portion of the second random access message indicates a different association between PCIs of the multiple PCIs and at least one of a PDSCH portion of the second random access message, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the one or more processors are further configured to apply a timing advance value received in a second random access message, of the one or more second random access messages, to all PCIs included in a timing advance group that includes a PCI associated with the second random access message.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

In some aspects, a base station for wireless communication may include a memory and one or more processors operatively coupled to the memory. The memory and the one or more processors may be configured to transmit an indication of an association between one or more downlink reference signals and a corresponding PCI of multiple PCIs associated with a serving cell, wherein the one or more downlink reference signals are used to identify one or more beams associated with one or more RACH occasions for a RACH procedure; receive one or more first random access messages in one or more corresponding RACH occasions associated with one or more PCIs of the multiple PCIs; and transmit one or more second random access messages, that include a PDCCH portion and a PDSCH portion, associated with the one or more PCIs based at least in part on receiving the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is transmitted in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the one or more processors are further configured to transmit the PDCCH portion in one or more PDCCH occasions, wherein the one or more PDCCH occasions corresponding to a PCI associated with the one or more corresponding RACH occasions in which the one or more first random access message are received.

In some aspects, the PDCCH portion includes scheduling information for at least one of the PDSCH portion of, one or more subsequent random access messages, or a combination thereof.

In some aspects, the PDCCH portion indicates a different association between PCIs of the multiple PCIs and at least one of the PDSCH portion, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

In some aspects, a non-transitory computer-readable medium may store one or more instructions for wireless communication. The one or more instructions, when executed by one or more processors of a UE, may cause the one or more processors to receive an indication of an association between one or more downlink reference signals and a corresponding PCI of multiple PCIs associated with a serving cell, wherein the one or more downlink reference signals are used to identify one or more beams associated with one or more RACH occasions for a RACH procedure; transmit one or more first random access messages in one or more corresponding RACH occasions associated with one or more PCIs of the multiple PCIs; and receive one or more second random access messages, that include a PDCCH portion and a PDSCH portion, associated with the one or more PCIs based at least in part on transmitting the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is received in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the one or more instructions, when executed by the one or more processors, further cause the one or more processors to monitor one or more PDCCH occasions for the PDCCH portion of the one or more second random access messages, wherein the one or more PDCCH occasions correspond to a PCI associated with the one or more corresponding RACH occasions in which the one or more first random access message are transmitted.

In some aspects, the one or more instructions, when executed by the one or more processors, further cause the one or more processors to receive a PDCCH portion of a second random access message of the one or more random access messages based at least in part on monitoring the one or more PDCCH occasions, wherein the PDCCH portion of the second random access message includes scheduling information for at least one of a PDSCH portion of the second random access message, one or more subsequent random access messages, or a combination thereof.

In some aspects, the one or more instructions, when executed by the one or more processors, further cause the one or more processors to receive a PDCCH portion of a second random access message of the one or more random access messages based at least in part on monitoring the one or more PDCCH occasions, wherein the PDCCH portion of the second random access message indicates a different association between PCIs of the multiple PCIs and at least one of a PDSCH portion of the second random access message, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the one or more instructions, when executed by the one or more processors, further cause the one or more processors to apply a timing advance value received in a second random access message, of the one or more second random access messages, to all PCIs included in a timing advance group that includes a PCI associated with the second random access message.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

In some aspects, a non-transitory computer-readable medium may store one or more instructions for wireless communication. The one or more instructions, when executed by one or more processors of a base station, may cause the one or more processors to transmit an indication of an association between one or more downlink reference signals and a corresponding PCI of multiple PCIs associated with a serving cell, wherein the one or more downlink reference signals are used to identify one or more beams associated with one or more RACH occasions for a RACH procedure; receive one or more first random access messages in one or more corresponding RACH occasions associated with one or more PCIs of the multiple PCIs; and transmit one or more second random access messages, that include a PDCCH portion and a PDSCH portion, associated with the one or more PCIs based at least in part on receiving the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is transmitted in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the one or more instructions, when executed by the one or more processors, further cause the one or more processors to transmit the PDCCH portion in one or more PDCCH occasions, wherein the one or more PDCCH occasions corresponding to a PCI associated with the one or more corresponding RACH occasions in which the one or more first random access message are received.

In some aspects, the PDCCH portion includes scheduling information for at least one of the PDSCH portion of, one or more subsequent random access messages, or a combination thereof.

In some aspects, the PDCCH portion indicates a different association between PCIs of the multiple PCIs and at least one of the PDSCH portion, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

In some aspects, an apparatus for wireless communication may include means for receiving an indication of an association between one or more downlink reference signals and a corresponding PCI of multiple PCIs associated with a serving cell, wherein the one or more downlink reference signals are used to identify one or more beams associated with one or more RACH occasions for a RACH procedure; means for transmitting one or more first random access messages in one or more corresponding RACH occasions associated with one or more PCIs of the multiple PCIs; and means for receiving one or more second random access messages, that include a PDCCH portion and a PDSCH portion, associated with the one or more PCIs based at least in part on transmitting the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is received in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the apparatus may further comprise means for monitoring one or more PDCCH occasions for the PDCCH portion of the one or more second random access messages, wherein the one or more PDCCH occasions correspond to a PCI associated with the one or more corresponding RACH occasions in which the one or more first random access message are transmitted.

In some aspects, the apparatus may further comprise means for receiving a PDCCH portion of a second random access message of the one or more random access messages based at least in part on monitoring the one or more PDCCH occasions, wherein the PDCCH portion of the second random access message includes scheduling information for at least one of a PDSCH portion of the second random access message, one or more subsequent random access messages, or a combination thereof.

In some aspects, the apparatus may further comprise means for receiving a PDCCH portion of a second random access message of the one or more random access messages based at least in part on monitoring the one or more PDCCH occasions, wherein the PDCCH portion of the second random access message indicates a different association between PCIs of the multiple PCIs and at least one of a PDSCH portion of the second random access message, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the apparatus may further comprise means for applying a timing advance value received in a second random access message, of the one or more second random access messages, to all PCIs included in a timing advance group that includes a PCI associated with the second random access message.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

In some aspects, an apparatus for wireless communication may include means for transmitting an indication of an association between one or more downlink reference signals and a corresponding PCI of multiple PCIs associated with a serving cell, wherein the one or more downlink reference signals are used to identify one or more beams associated with one or more RACH occasions for a RACH procedure; means for receiving one or more first random access messages in one or more corresponding RACH occasions associated with one or more PCIs of the multiple PCIs; and means for transmitting one or more second random access messages, that include a PDCCH portion and a PDSCH portion, associated with the one or more PCIs based at least in part on receiving the one or more first random access messages.

In some aspects, the indication further indicates a beam sweeping pattern, for the one or more downlink reference signals, that indicates the association between the one or more downlink reference signals and the corresponding one or more PCIs of the multiple PCIs associated with the serving cell.

In some aspects, a first downlink reference signal included in the one or more downlink reference signals is associated with a first PCI of the serving cell and a second downlink reference signal included in the one or more downlink reference signals is associated with a second PCI of the serving cell.

In some aspects, each downlink reference signal, in the one or more downlink reference signals, corresponds to a particular PCI of the multiple PCIs associated with the serving cell.

In some aspects, all RACH occasions corresponding to the one or more downlink reference signals occur before an RAR window corresponding to those RACH occasions, the RAR window includes PDCCH monitoring occasions associated with all PCIs of the multiple PCIs.

In some aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In some aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In some aspects, the indication is transmitted in a radio resource configuration message for contention-free random access, a PDCCH order message that triggers the RACH procedure, or a combination thereof.

In some aspects, the indication further indicates an association between one or more PDCCH monitoring occasions, of a set of PDCCH monitoring occasions used for the RACH procedure, and a PCI of the multiple PCIs associated with the serving cell.

In some aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In some aspects, the apparatus may further comprise means for transmitting the PDCCH portion in one or more PDCCH occasions, wherein the one or more PDCCH occasions corresponding to a PCI associated with the one or more corresponding RACH occasions in which the one or more first random access message are received.

In some aspects, the PDCCH portion includes scheduling information for at least one of the PDSCH portion of, one or more subsequent random access messages, or a combination thereof.

In some aspects, the PDCCH portion indicates a different association between PCIs of the multiple PCIs and at least one of the PDSCH portion, one or more subsequent random access messages, or a combination thereof.

In some aspects, the multiple PCIs are included in a same timing advance group.

In some aspects, different PCIs, included in the multiple PCIs, are associated with different timing advance groups.

In some aspects, the multiple PCIs are included in a same timing advance group or in different timing advance groups based at least in part on a purpose of the RACH procedure.

In some aspects, the multiple PCIs are associated with co-located base stations or transmit receive points.

In some aspects, different PCIs, included in the multiple PCIs, are associated with base stations or transmit receive points in different locations.

In some aspects, the one or more downlink reference signals includes at least one of a set of synchronization signal blocks, a set of channel state information reference signals, or a combination thereof.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
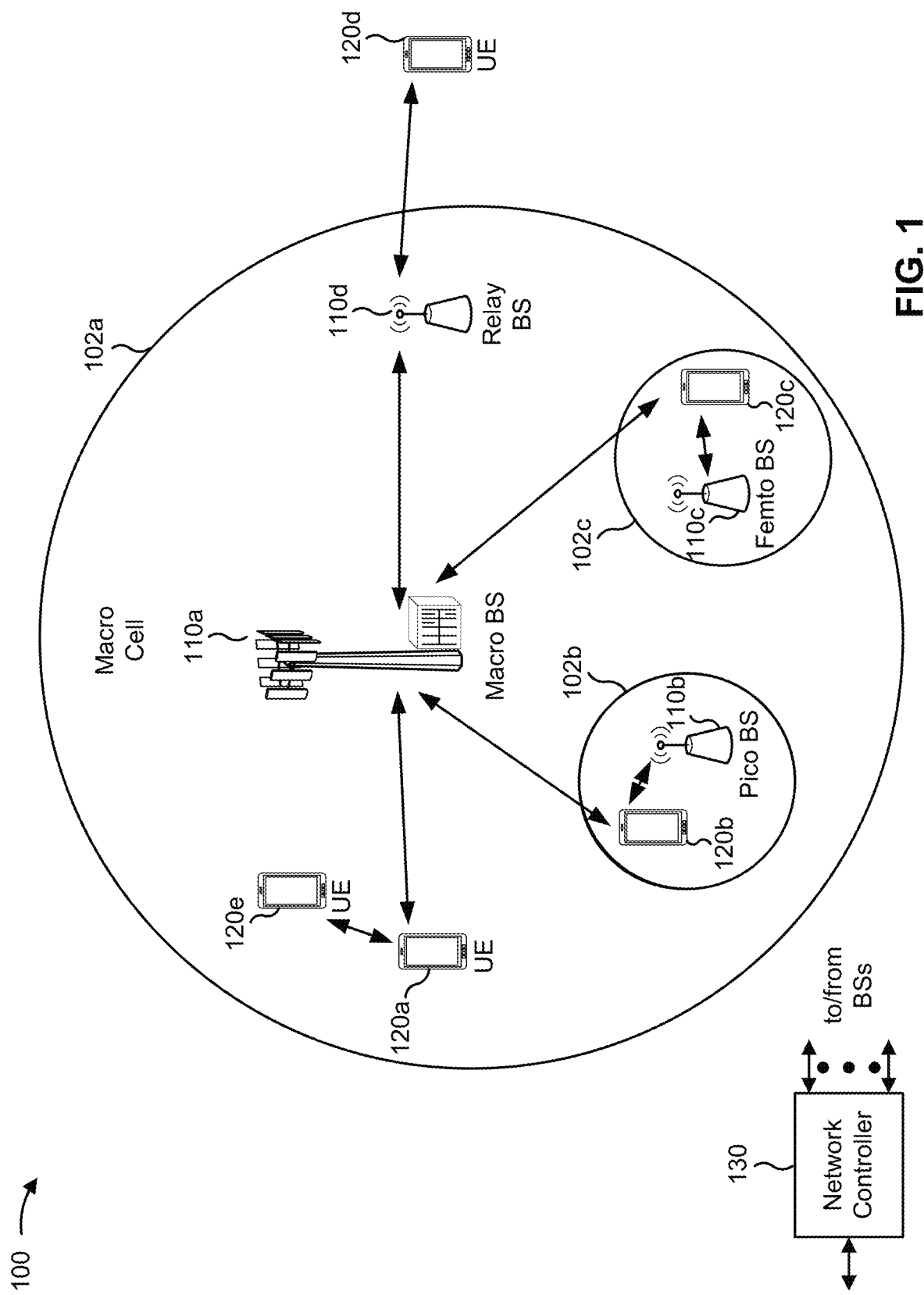
FIG. 1 is a diagram illustrating an example of a wireless communication network, in accordance with the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
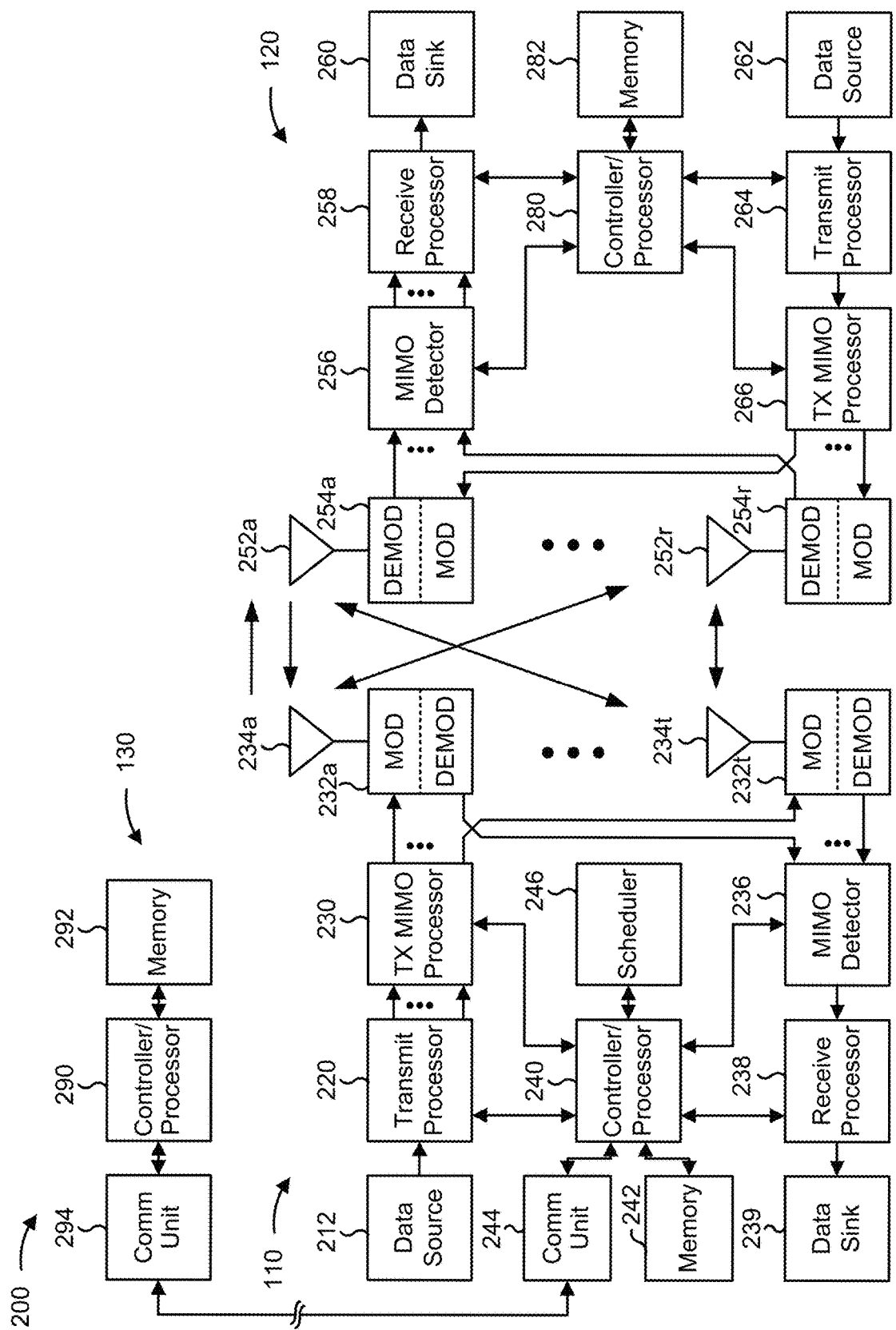
FIG. 2 is a diagram illustrating an example of a base station in communication with a UE in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Controller/processor 240 of base station 110, controller/processor 280 of UE 120, and/or any other component(s) of FIG. 2 may perform one or more techniques associated with RACH beam sweeping across multiple PCIs of a serving cell, as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1400 of FIG. 14, process 1500 of FIG. 15, and/or other processes as described herein. A scheduler 246 may schedule UEs for data transmission on the downlink and/or uplink.

In some aspects, UE 120 may include means for receiving an indication of an association between one or more downlink reference signals and a corresponding PCI of multiple PCIs associated with a serving cell, wherein the one or more downlink reference signals are used to identify one or more beams associated with one or more RACH occasions for a RACH procedure; means for transmitting one or more first random access messages in one or more corresponding RACH occasions associated with one or more PCIs of the multiple PCIs; means for receiving one or more second random access messages, that include a PDCCH portion and a PDSCH portion, associated with the one or more PCIs based at least in part on transmitting the one or more first random access messages; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication of an association between one or more downlink reference signals and a corresponding PCI of multiple PCIs associated with a serving cell, wherein the one or more downlink reference signals are used to identify one or more beams associated with one or more RACH occasions for a RACH procedure; means for receiving one or more first random access messages in one or more corresponding RACH occasions associated with one or more PCIs of the multiple PCIs; means for transmitting one or more second random access messages, that include a PDCCH portion and a PDSCH portion, associated with the one or more PCIs based at least in part on receiving the one or more first random access messages; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
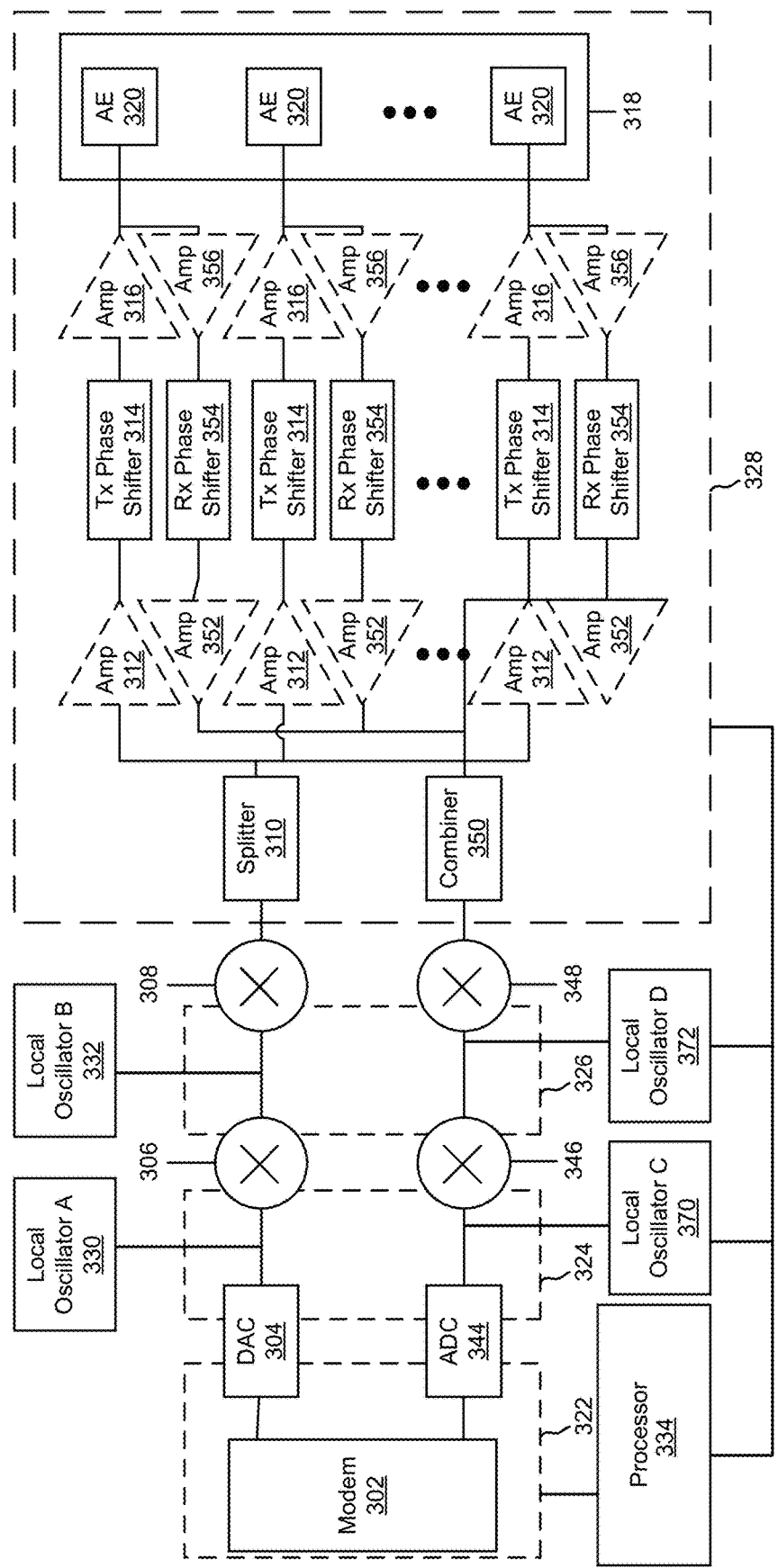
FIG. 3 is a diagram illustrating an example of a beamforming architecture that supports determining sub-dominant clusters in a millimeter wave (mmW) channel, in accordance with the present disclosure.

FIG. 3 is a diagram illustrating an example beamforming architecture 300 that supports determining sub-dominant clusters in a millimeter wave (mmW) channel, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a processor 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the processor 334) to provide independent control of the gain for each antenna element 320. For example, the modem 302 and/or the processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be set to provide a desired amount of phase shift or the same amount of phase shift or some other configuration. The modem 302 and/or the processor 334 may have at least one control line connected to each of the phase shifters 314 and which may be used to configure the phase shifters 314 to provide desired amounts of phase shift or phase offset between antenna elements 320.

In the illustrated architecture 300, RF signals received by the antenna elements 320 are provided to one or more of first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more of phase shifters 354 to provide a configurable phase shift or phase offset for the corresponding received RF signal. The phase shifter 354 may be an active phase shifter or a passive phase shifter. The settings of the phase shifters 354 are independent, meaning that each can be set to provide a desired amount of phase shift or the same amount of phase shift or some other configuration. The modem 302 and/or the processor 334 may have at least one control line connected to each of the phase shifters 354 and which may be used to configure the phase sifters 354 to provide a desired amount of phase shift or phase offset between antenna elements 320.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The processor 334 may be located partially or fully within one or more other components of the architecture 300. For example, the processor 334 may be located within the modem 302 in some aspects.

As indicated above, FIG. 3 is provided as an example. Other examples may differ from what is described with regard to FIG. 3.

Figure 4:
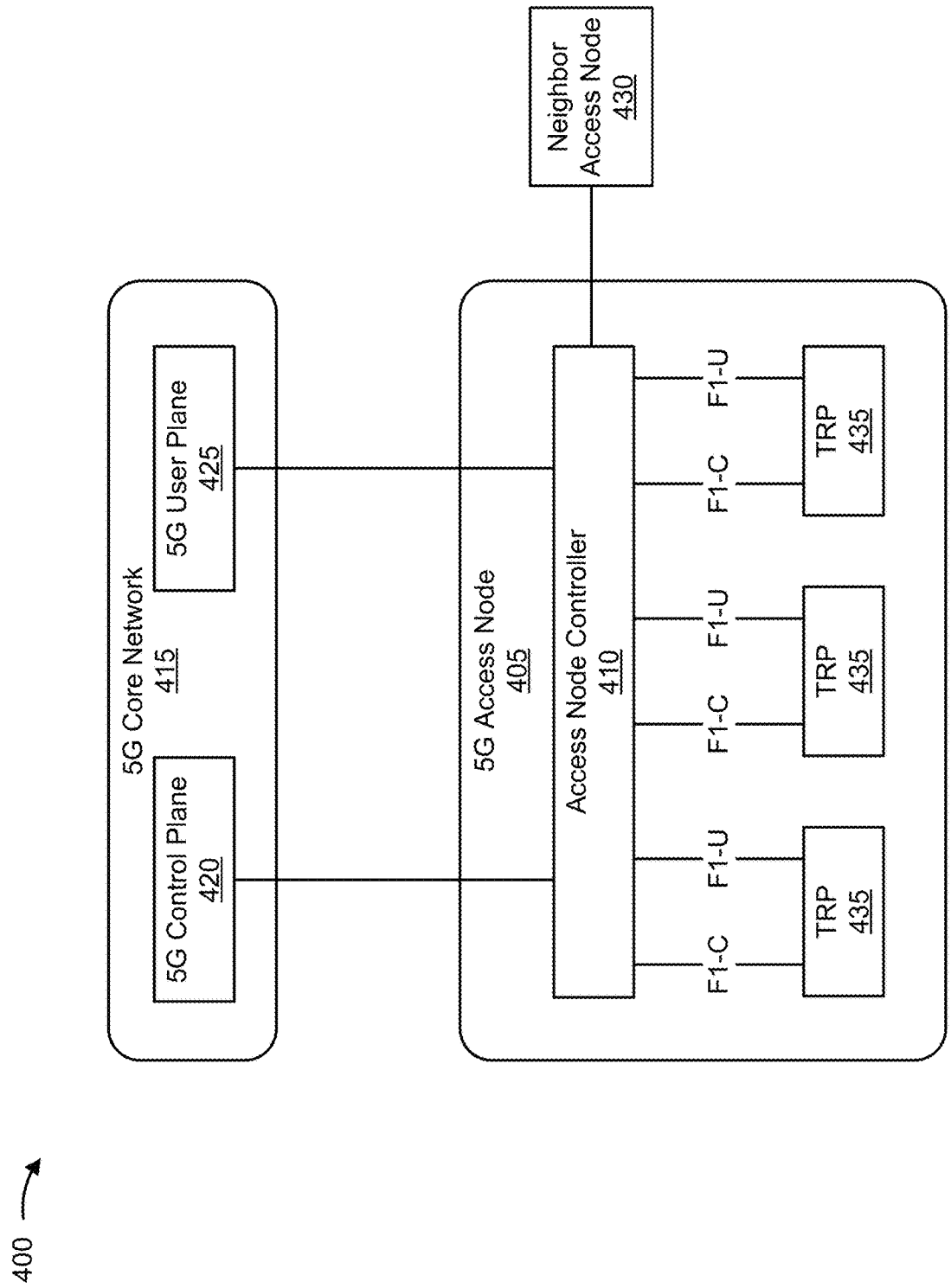
FIG. 4 is a diagram illustrating an example of a logical architecture of a distributed radio access network (RAN), in accordance with the present disclosure.

FIG. 4 illustrates an example logical architecture of a distributed RAN 400, according to aspects of the present disclosure.

A 5G access node 405 may include an access node controller 410. The access node controller 410 may be a central unit (CU) of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405, an LTE access node, and/or the like) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a distributed unit (DU) of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, an array, and/or the like. In some aspects, different TRPs 435 may be associated with different physical cell identifiers (PCIs). The different TRPs 435 and/or the different PCIs may be associated with the same serving cell (e.g., the same base station 110, the same 5G access node 405, the same access node controller 410, the same cell identifier, and/or the like).

A TRP 435 may be connected to a single access node controller 410 or to multiple access node controllers 410. In some aspects, a dynamic configuration of split logical functions may be present within the architecture of distributed RAN 400. For example, a packet data convergence protocol (PDCP) layer, a radio link control (RLC) layer, a medium access control (MAC) layer, and/or the like may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, a symbol, and/or the like) or different TTIs using different quasi co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
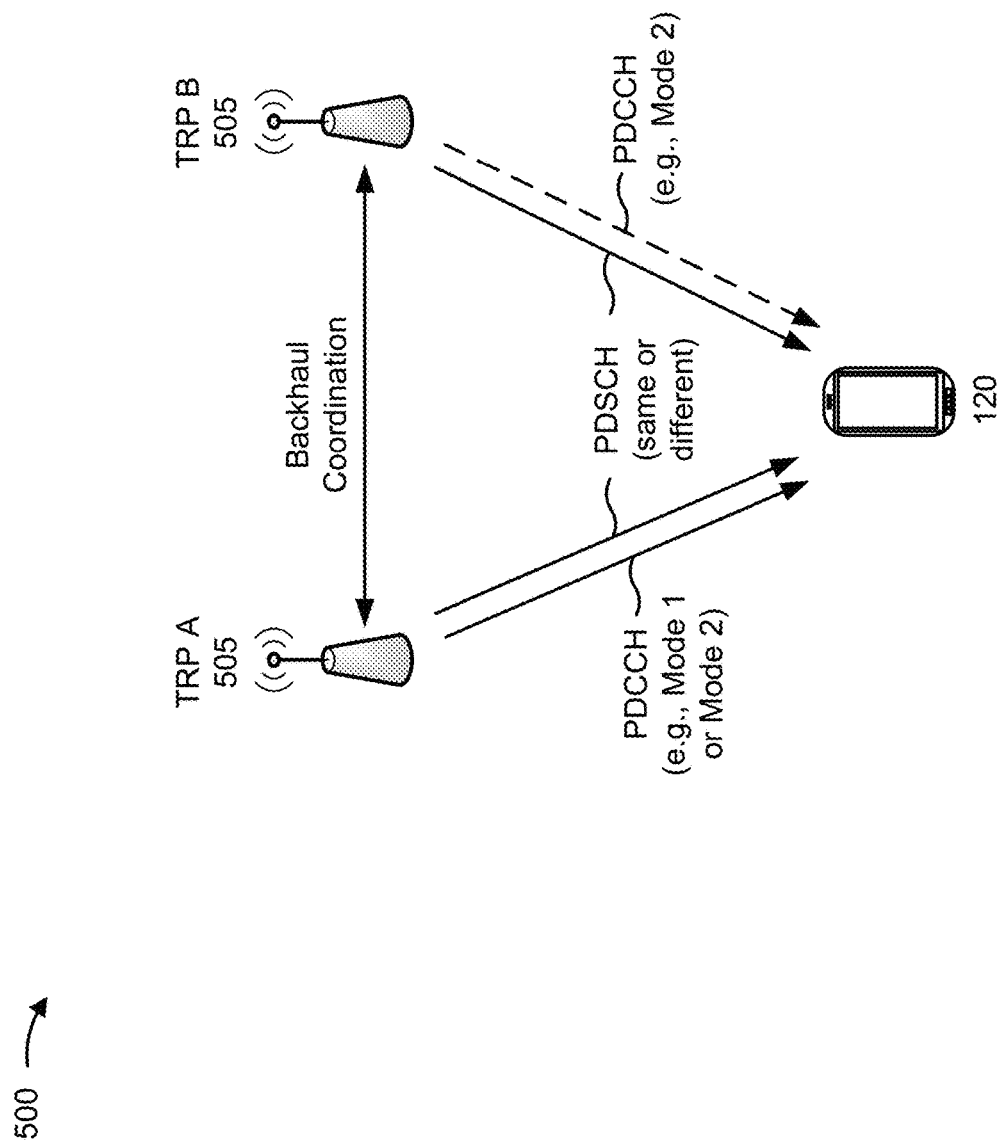
FIG. 5 is a diagram illustrating an example of multi-TRP communication, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions and/or the like) to improve reliability, increase throughput, and/or the like. The TRPs 505 may coordinate such communications via an interface between the TRPs 505 (e.g., a backhaul interface, an access node controller 410, and/or the like). The interface may have a smaller delay and/or higher capacity when the TRPs 505 are co-located at the same base station 110 (e.g., when the TRPs 505 are different antenna arrays or panels of the same base station 110), and may have a larger delay and/or lower capacity (as compared to co-location) when the TRPs 505 are located at different base stations 110. The different TRPs 505 may communicate with the UE 120 using different QCL relationships (e.g., different TCI states), different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0, DCI format 1_1, and/or the like) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

In some aspects, different TRPs 505 may be associated with different PCIs of the same serving cell. Additionally, or alternatively, different TRPs 505 may communicate with the UE 120 using different beam pairs (e.g., a UE Tx beam and a corresponding TRP or base station Rx beam, a UE Rx beam and a corresponding TRP or base station Tx beam, and/or the like). In some aspects, a serving cell may associate a plurality of synchronization signal blocks (SSBs), as described below in connection with FIG. 6, with TRPs 505. When a serving cell uses different PCIs, the serving cell may divide the plurality of SSBs amongst the different TRPs 505 such that the different PCIs do not share SSBs. Division of the SSBs amongst the different TRPs 505 may result in suboptimal selection of beams for communicating with UE 120, e.g., in a RACH procedure as described below in connection with FIGS. 7-8.

As indicated above, FIG. 5 is provided as an example. Other examples may differ from what is described with respect to FIG. 5.

Figure 6:
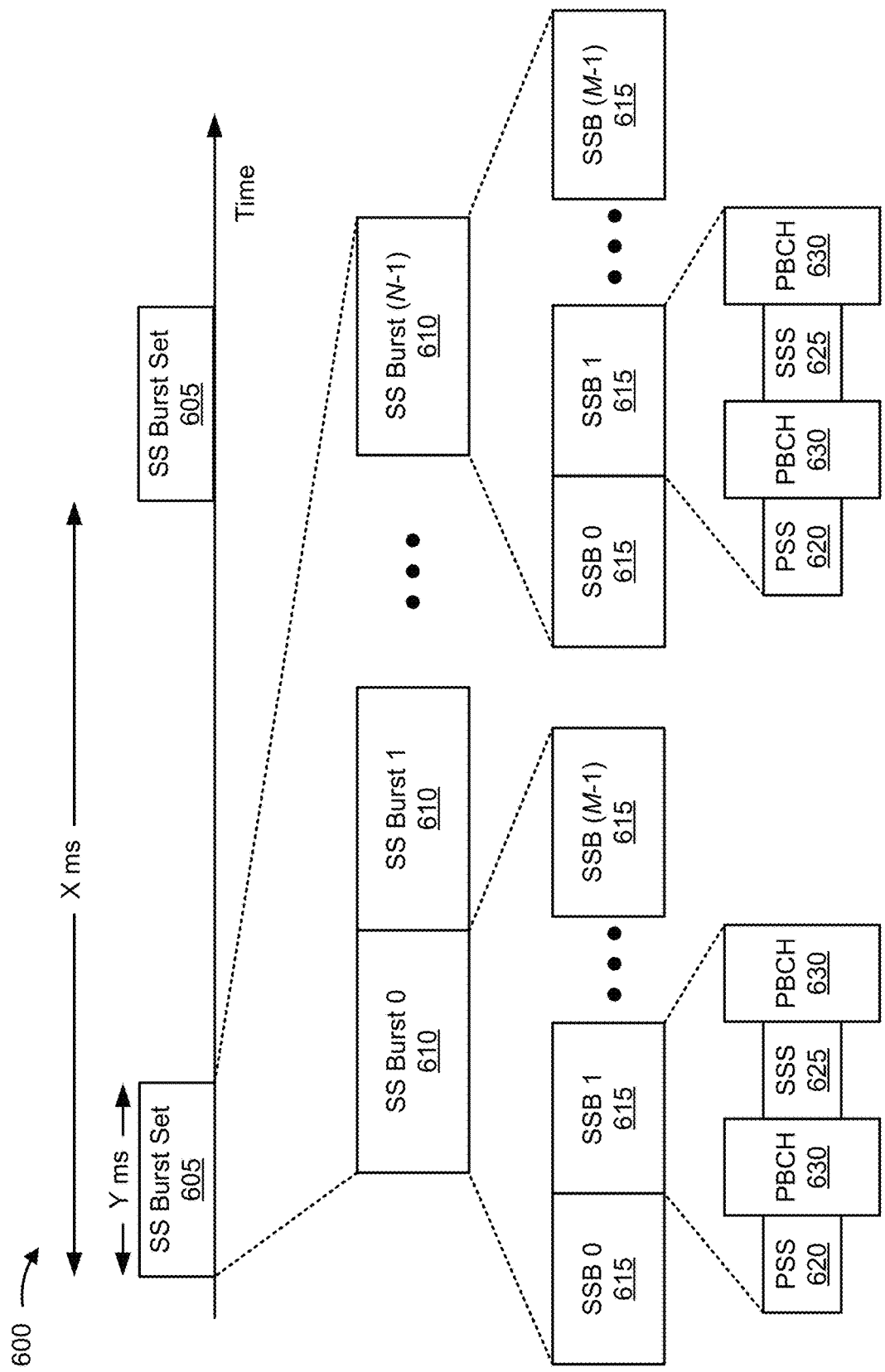
FIG. 6 is a diagram illustrating an example of a synchronization signal (SS) hierarchy, in accordance with the present disclosure.

FIG. 6 is a diagram illustrating an example 600 of a synchronization signal (SS) hierarchy, in accordance with the present disclosure. As shown in FIG. 6, the SS hierarchy may include an SS burst set 605, which may include multiple SS bursts 610, shown as SS burst 0 through SS burst N−1, where N is a maximum number of repetitions of the SS burst 610 that may be transmitted by the base station. As further shown, each SS burst 610 may include one or more SS blocks (SSBs) 615, shown as SSB 0 through SSB M−1, where M is a maximum number of SSBs 615 that can be carried by an SS burst 610. In some aspects, different SSBs 615 may be beam-formed differently (e.g., transmitted using different beams), and may be used for beam management, beam selection, and/or the like (e.g., as part of an initial network access procedure). An SS burst set 605 may be periodically transmitted by a wireless node (e.g., base station 110), such as every X milliseconds, as shown in FIG. 6. In some aspects, an SS burst set 605 may have a fixed or dynamic length, shown as Y milliseconds in FIG. 6. In some cases, an SS burst set 605 or an SS burst 610 may be referred to as a discovery reference signal (DRS) transmission window, an SSB measurement time configuration (SMTC) window, and/or the like.

In some aspects, an SSB 615 may include resources that carry a primary synchronization signal (PSS) 620, a secondary synchronization signal (SSS) 625, a physical broadcast channel (PBCH) 630, and/or the like. In some aspects, multiple SSBs 615 are included in an SS burst 610 (e.g., with transmission on different beams), and the PSS 620, the SSS 625, and/or the PBCH 630 may be the same across each SSB 615 of the SS burst 610. In some aspects, a single SSB 615 may be included in an SS burst 610. In some aspects, the SSB 615 may be at least four symbols (e.g., OFDM symbols) in length, where each symbol carries one or more of the PSS 620 (e.g., occupying one symbol), the SSS 625 (e.g., occupying one symbol), and/or the PBCH 630 (e.g., occupying two symbols). In some aspects, an SSB 615 may be referred to as an SS/PBCH block.

In some aspects, the symbols of an SSB 615 are consecutive, as shown in FIG. 6. In some aspects, the symbols of an SSB 615 are non-consecutive. Similarly, in some aspects, one or more SSBs 615 of the SS burst 610 may be transmitted in consecutive radio resources (e.g., consecutive symbols) during one or more slots. Additionally, or alternatively, one or more SSBs 615 of the SS burst 610 may be transmitted in non-consecutive radio resources.

In some aspects, the SS bursts 610 may have a burst period, and the SSBs 615 of the SS burst 610 may be transmitted by a wireless node (e.g., base station 110) according to the burst period. In this case, the SSBs 615 may be repeated during each SS burst 610. In some aspects, the SS burst set 605 may have a burst set periodicity, whereby the SS bursts 610 of the SS burst set 605 are transmitted by the wireless node according to the fixed burst set periodicity. In other words, the SS bursts 610 may be repeated during each SS burst set 605.

In some aspects, an SSB 615 may include an SSB index, which may correspond to a beam used to carry the SSB 615. A UE 120 may monitor for and/or measure SSBs 615 using different receive (Rx) beams during an initial network access procedure. Based at least in part on the monitoring and/or measuring, the UE 120 may indicate one or more SSBs 615 with a best signal parameter (e.g., a reference signal received power (RSRP) parameter and/or the like) to a base station 110. The base station 110 and the UE 120 may use the one or more indicated SSBs 615 to select one or more beams to be used for communication between the base station 110 and the UE 120 (e.g., for a random access channel (RACH) procedure and/or the like). Additionally, or alternatively, the UE 120 may use the SSB 615 and/or the SSB index to determine a cell timing for a cell via which the SSB 615 is received (e.g., a serving cell).

As indicated above, FIG. 6 is provided as an example. Other examples may differ from what is described with regard to FIG. 6.

Figure 7:
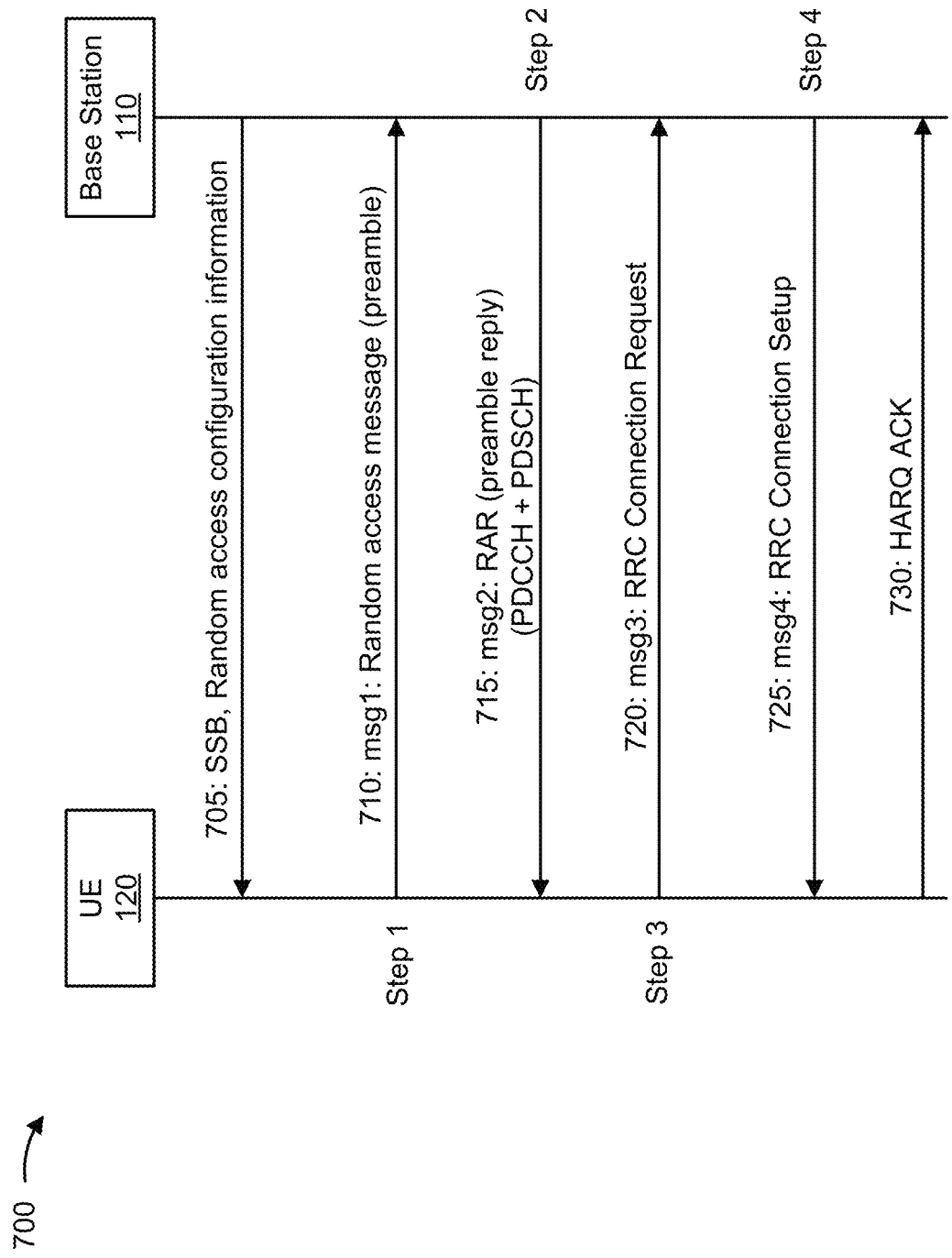
FIG. 7 is a diagram illustrating an example of a four-step random access procedure, in accordance with the present disclosure.

FIG. 7 is a diagram illustrating an example of a four-step random access procedure, in accordance with the present disclosure. As shown in FIG. 7, a base station 110 and a UE 120 may communicate with one another to perform the four-step random access procedure.

As shown by reference number 705, the base station 110 may transmit, and the UE 120 may receive, one or more SSBs and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message, one or more parameters for receiving an RAR, and/or the like.

As shown by reference number 710, the UE 120 may transmit a random access message, which may include a preamble (sometimes referred to as a random access preamble, a PRACH preamble, and/or the like). The message that includes the preamble may be referred to as a message 1, msg1, MSG1, a first message, an initial message, and/or the like in a four-step random access procedure. The random access message may include a random access preamble identifier.

As shown by reference number 715, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 720, the UE 120 may transmit an RRC connection request message. The RRC connection request message may be referred to as message 3, msg3, MSG3, or a third message of a four-step random access procedure. In some aspects, the RRC connection request may include a UE identifier, UCI, a PUSCH communication (e.g., an RRC connection request), and/or the like.

As shown by reference number 725, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 730, if the UE 120 successfully receives the RRC connection setup message, the UE 120 may transmit a HARQ ACK.

In some aspects, the base station 110 and/or the UE 120 may determine one or more optimal beams (and/or SSBs) to use for the RACH procedure shown in FIG. 7. For example, the base station 110 and/or the UE 120 may use a mapping, such as one defined in 3GPP standards, to determine an optimal beam (and/or SSB) to use for a particular RACH occasion (RO) between the base station 110 and/or the UE 120. However, if a serving cell uses multiple PCIs, the base station 110 and/or the UE 120 may have a limited subset of beams (and/or SSBs) from which to select the optimal beam (and/or SSB) depending on which PCI the base station 110 is using with the UE 120. Therefore, the base station 110 and/or the UE 120 may select a suboptimal beam (and/or SSB) based on the PCI being used.

As indicated above, FIG. 7 is provided as an example. Other examples may differ from what is described with regard to FIG. 7.

Figure 8:
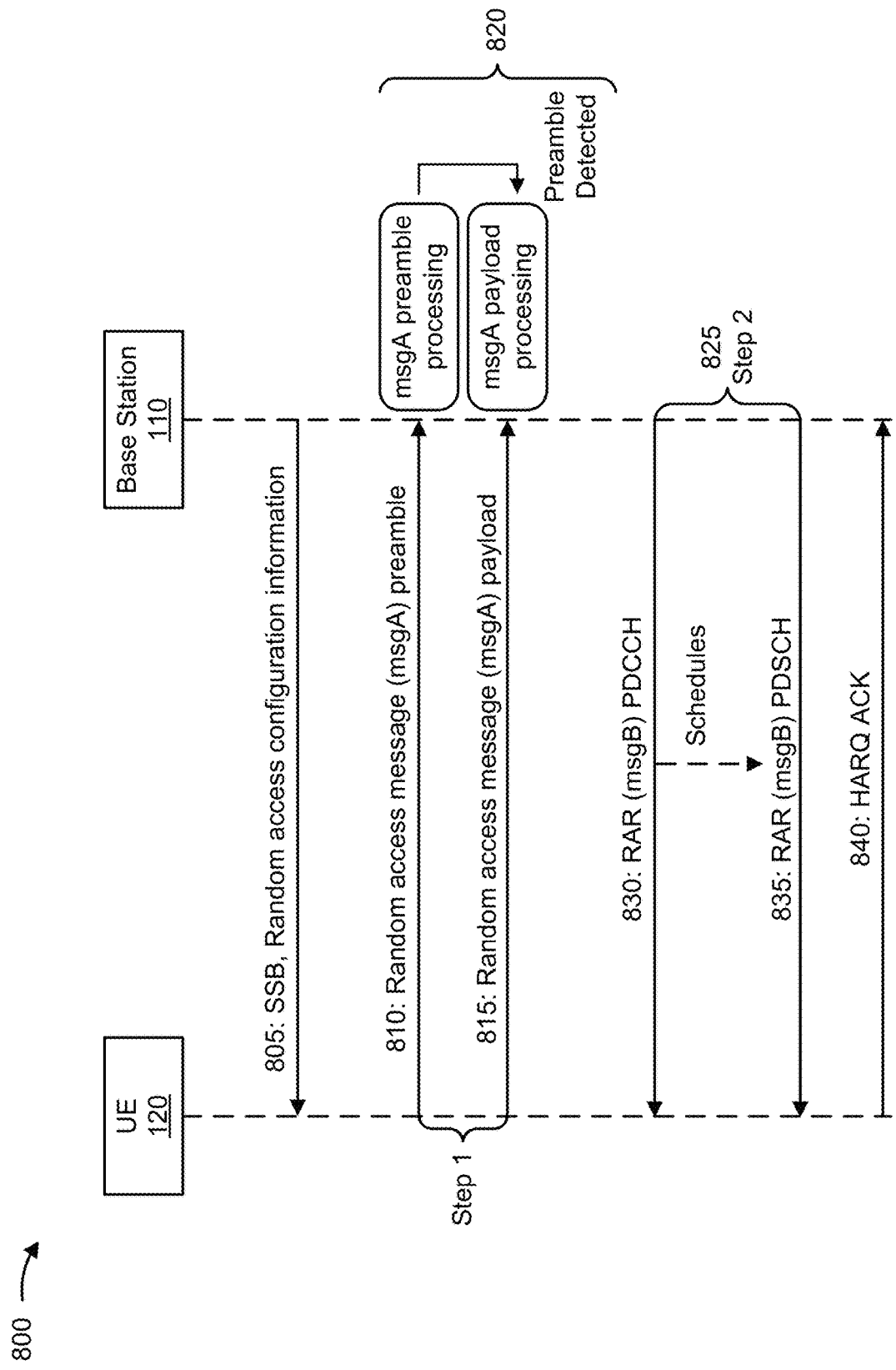
FIG. 8 is a diagram illustrating an example of a two-step random access procedure, in accordance with the present disclosure.

FIG. 8 is a diagram illustrating an example 800 of a two-step random access procedure, in accordance with the present disclosure. As shown in FIG. 8, a base station 110 and a UE 120 may communicate with one another to perform the two-step random access procedure.

As shown by reference number 805, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message, receiving a random access response (RAR) to the random access message, and/or the like.

As shown by reference number 810, the UE 120 may transmit, and the base station 110 may receive, a random access message preamble. As shown by reference number 815, the UE 120 may transmit, and the base station 110 may receive, a random access message payload. As shown, the UE 120 may transmit the random access message preamble and the random access message payload to the base station 110 as part of an initial (or first) step of the two-step random access procedure. In some aspects, the random access message may be referred to as message A, msgA, a first message, an initial message, and/or the like in a two-step random access procedure. Furthermore, in some aspects, the random access message preamble may be referred to as a message A preamble, a msgA preamble, a preamble, a physical random access channel (PRACH) preamble, and/or the like, and the random access message payload may be referred to as a message A payload, a msgA payload, a payload, and/or the like. In some aspects, the random access message may include some or all of the contents of message 1 (msg1) and message 3 (msg3) of a four-step random access procedure, which is described in more detail below. For example, the random access message preamble may include some or all contents of message 1 (e.g., a PRACH preamble), and the random access message payload may include some or all contents of message 3 (e.g., a UE identifier, uplink control information (UCI), a physical uplink shared channel (PUSCH) transmission, and/or the like).

As shown by reference number 820, the base station 110 may receive the random access message preamble transmitted by the UE 120. If the base station 110 successfully receives and decodes the random access message preamble, the base station 110 may then receive and decode the random access message payload.

As shown by reference number 825, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, contention resolution information, and/or the like.

As shown by reference number 830, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 835, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 840, if the UE 120 successfully receives the RAR, the UE 120 may transmit a hybrid automatic repeat request (HARQ) acknowledgement (ACK).

In some aspects, as explained above in connection with FIG. 7, the base station 110 and/or the UE 120 may determine one or more optimal beams (and/or SSB) to use for the RACH procedure shown in FIG. 8. For example, the base station 110 and/or the UE 120 may use a mapping, such as one defined in 3GPP standards, to determine an optimal beam (and/or SSB) to use for a particular RO between the base station 110 and/or the UE 120. However, if a serving cell uses multiple PCIs, the base station 110 and/or the UE 120 may have a limited subset of beams (and/or SSBs) from which to select the optimal beam (and/or SSB) depending on which PCI the base station 110 is using with the UE 120. Therefore, the base station 110 and/or the UE 120 may select a suboptimal beam (and/or SSB) based on the PCI being used.

As indicated above, FIG. 8 is provided as an example. Other examples may differ from what is described with regard to FIG. 8.

Figure 9:
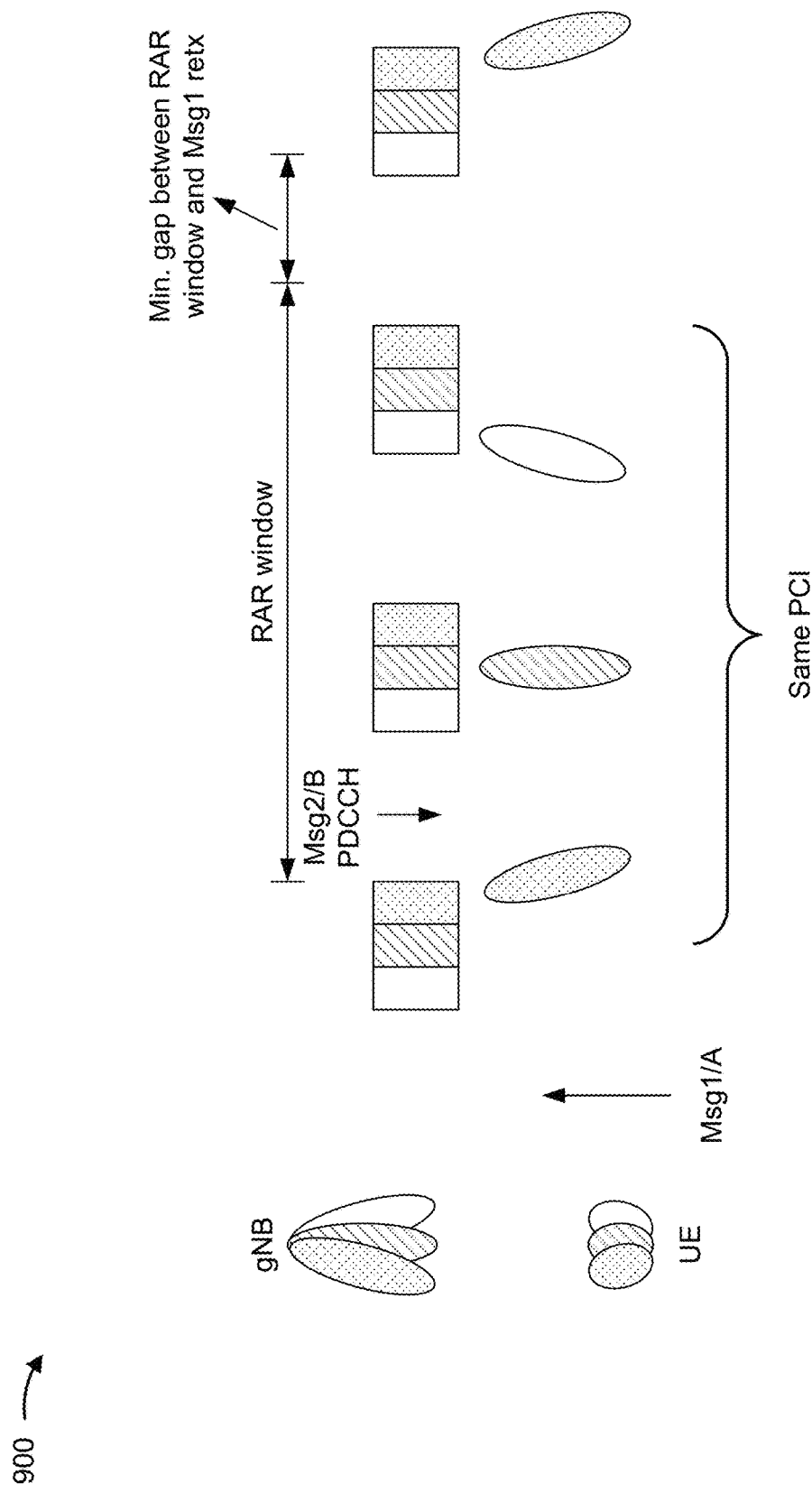
FIG. 9 is a diagram illustrating an example of an association between one or more downlink reference signals and a corresponding PCI associated with a serving cell, in accordance with the present disclosure.

FIG. 9 is a diagram illustrating an example 900 of an association between one or more downlink reference signals and a corresponding PCI associated with a serving cell, in accordance with the present disclosure. As shown in FIG. 9, a base station (gNB) may use a plurality of SSBs (shown as three SSBs in the example of FIG. 9). In the example of FIG. 9, the base station uses the plurality of SSBs in a plurality of ROs with a UE. Additionally, or alternatively, the base station may use the plurality of SSBs in a plurality of ROs with a plurality of UEs.

As further shown in FIG. 9, the UE may transmit a random access message (also referred to as Msg1 or MsgA or "Msg1/A") to the base station, requesting an RO on a particular beam or SSB. Based at least in part on the random access message transmission, the UE monitors for an RAR message (also referred to as Msg2 or MsgB or "Msg2/B") from the base station during an RAR window (e.g., as defined by 3GPP specifications). When the UE does not detect the RAR message during the RAR window, the UE waits a minimum gap after expiry of the RAR window before retransmitting the random access message.

To reduce RACH latency, the UE may retransmit the random access message before expiry of the RAR window. The retransmitting of the random access message is also referred to as beam sweeping. To improve reliability of the beam sweeping, the UE may use a different beam or SSB for each retransmission, as shown in FIG. 9. The SSBs used for the random access messages are associated with the PCI of the serving cell in which the base station is operating, as further shown in FIG. 9.

When a serving cell including the base station uses a plurality of PCIs, the base station seeks to avoid PCI confusion with UEs communicating with the base station. For example, PCI confusion may result in lower quality and/or reliability on one or more RACHs between the UEs and the base station or even loss of communication altogether on the one or more RACHs. Accordingly, the PCIs are associated with subsets of the SSBs used within the serving cell such that no SSB is associated with a plurality of PCIs. However, as described above in connection with FIGS. 7-8, the base station and one or more UEs communicating with the base station may select suboptimal SSBs for ROs based on the subset of SSBs associated with the PCI used by the base station and the one or more UEs. Some techniques and apparatuses described herein enable a base station to use beam sweeping across PCIs to allow use of a full set, or at least a larger subset, of SSBs used in the serving cell without PCI confusion. The beam sweeping described herein may improve communication quality and reliability between a base station and a UE communicating in an RO.

As indicated above, FIG. 9 is provided as an example. Other examples may differ from what is described with respect to FIG. 9.

Figure 10:
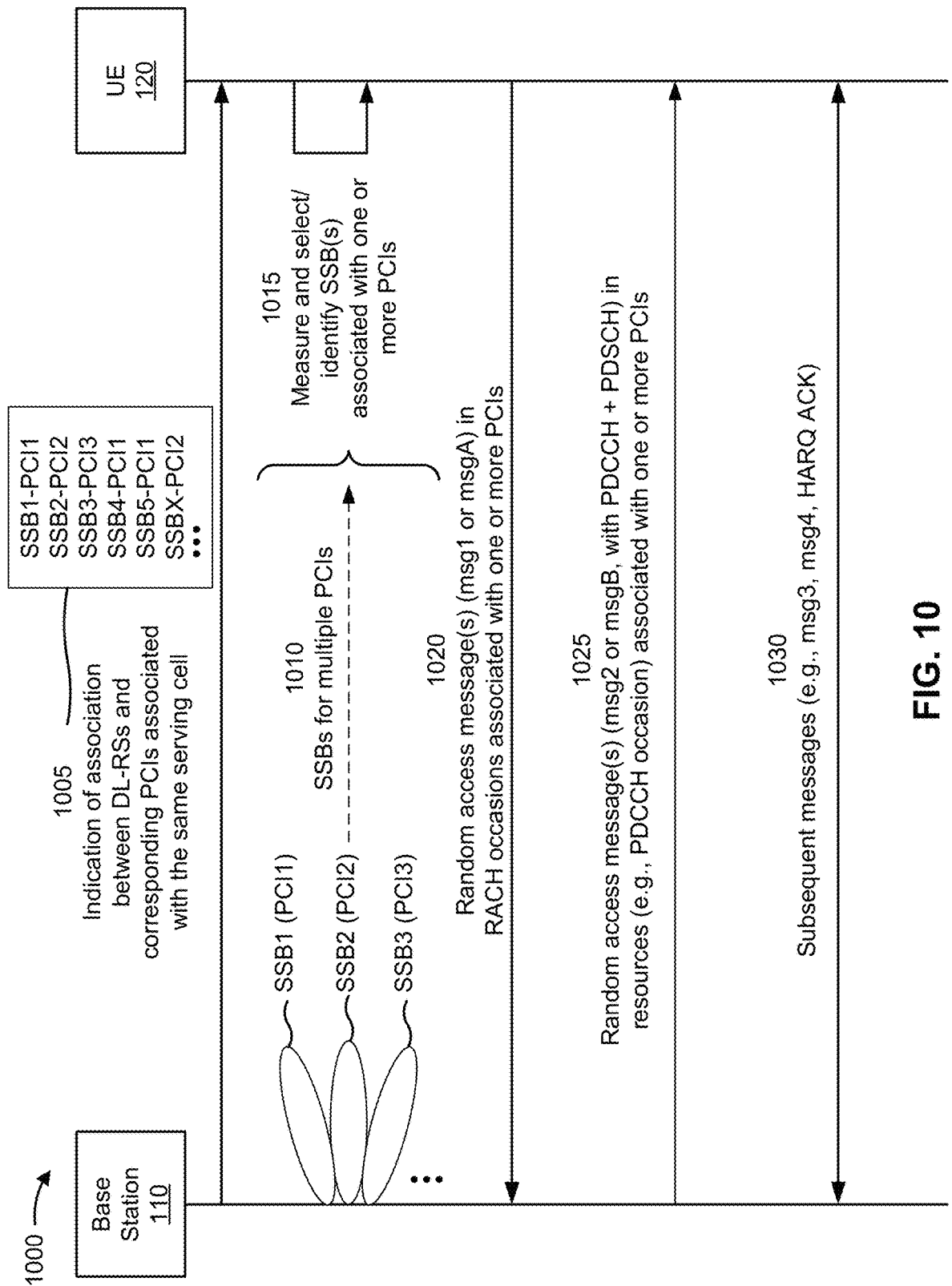
FIG. 10 is a diagram illustrating an example of RACH beam sweeping across multiple PCIs of a serving cell, in accordance with the present disclosure.

FIG. 10 is a diagram illustrating an example 1000 of RACH beam sweeping across multiple PCIs of a serving cell, in accordance with the present disclosure. As shown in FIG. 10, a base station 110 and a UE 120 may communicate with one another. For example, as further shown in FIG. 10, the base station 110 and the UE 120 may communicate to establish one or more ROs.

As shown by reference number 1005, the base station 110 may associate one or more downlink reference signals (DL-RSs) with a corresponding PCI of multiple PCIs associated with the serving cell in which the base station 110 is operating. In some aspects, some or all of the multiple PCIs may be included in a same timing advance group (TAG). In some aspects, different PCIs included in the multiple PCIs may be associated with different TAGs. For example, the multiple PCIs may be included in the same TAG or in different TAGs based at least in part on a purpose of a RACH procedure in which the multiple PCIs are used, as described below.

In some aspects, some or all of the multiple PCIs may be associated with co-located base stations or transmit receive points (TRPs). For example, some or all of the multiple PCIs may be associated with any base stations and/or transmit receive points co-located with the base station 110. Additionally, or alternatively, different PCIs included in the multiple PCIs may be associated with base stations or TRPs in different locations. For example, a first subset of the multiple PCIs may be associated with the base station 110, and a second subset of the multiple PCIs may be associated with a different base station and/or TRP in the serving cell.

In some aspects, each DL-RS in the one or more DL-RSs has one corresponding PCI of the multiple PCIs associated with the serving cell. For example, a first DL-RS included in the one or more DL-RSs may be associated with a first PCI of the serving cell and a second DL-RS included in the one or more DL-RSs may be associated with a second PCI of the serving cell.

In some aspects, the one or more DL-RSs may include at least one of a set of SSBs, a set of channel state information reference signals, or a combination thereof. As further shown by reference number 1005, multiple SSBs may be associated with a single PCI (e.g., SSB1, SSB4, and SSB5 are associated with PCI1). Additionally, or alternatively, multiple PCIs may be associated with a single SSB.

As shown by reference number 1010, the base station 110 may transmit, to the UE 120, an indication of the association between one or more DL-RSs and the corresponding PCI of multiple PCIs associated with the serving cell. For example, the indication may be received, by the UE 120, in an RRC message for contention-free random access (RA), a PDCCH order message that triggers a RACH procedure, or a combination thereof.

In some aspects, the one or more DL-RSs may be used to identify one or more beams (or SSBs) associated with one or more ROs for a RACH procedure. For example, as shown by reference number 1015, the UE 120 may measure the DL-RSs (e.g., in the form of a channel quality indicator (CQI) and/or other measure of signal quality and/or reliability) and identify or select the one or more SSBs to be used for the one or more ROs for a RACH procedure with the base station 110. As shown in FIG. 10, the UE 120 may identify or select the one or more SSBs that are associated with one or more PCIs of the serving cell in which the base station 110 is operating. Accordingly, the UE 120 may initiate a plurality of ROs with the base station 110 using a plurality of PCIs.

In some aspects, the indication may further indicate a beam sweeping pattern, for the one or more DL-RSs, that indicates the association between the one or more DL-RSs and the PCI of the multiple PCIs associated with the serving cell. For example, the beam sweeping pattern may indicate directionality, pulse duration, pulse frequency, and/or like of the DL-RSs.

Additionally, or alternatively, the indication may indicate an association between one or more PDCCH monitoring occasions, of a set of PDCCH monitoring occasions used for the RACH procedure, and a PCI of the multiple PCIs associated with the serving cell. For example, a first PDCCH monitoring occasion included in the set of PDCCH monitoring occasions may be associated with a first PCI of the serving cell and a second PDCCH monitoring occasion included in the set of PDCCH monitoring occasions may be associated with a second PCI of the serving cell. In some aspects, the indication may define the one or more PDCCH monitoring occasions within a common RAR window for a plurality of the multiple PCIs and/or within an individual RAR window for a single PCI of the multiple PCIs.

As shown by reference number 1020, the UE 120 may transmit, to the base station 110, one or more first random access messages (Msg1s or MsgAs) in one or more corresponding ROs associated with one or more PCIs of the multiple PCIs. For example, the one or more first random access messages may include a random access preamble identifier, as described above in connection with FIG. 7.

In some aspects, the UE 120 may transmit the one or more first random access messages according to a pattern defined by or associated with the indication received from the base station 110. For example, the UE 120 may transmit the one or more first random access messages in one or more shared occasions, as described below with respect to FIGS. 11 and 12, and/or in one or more individual occasions, as described below with respect to FIG. 13.

As shown by reference number 1025, the UE 120 may receive, from the base station 110, one or more second random access messages (RARs or Msg2s or MsgBs), that include a PDCCH portion and a PDSCH portion, associated with the one or more PCIs based at least in part on transmitting the one or more first random access messages. For example, the one or more second random access messages may indicate the detected random access preamble identifier (e.g., received from the UE 120 as described above). In some aspects, the base station 110 may transmit a PDCCH communication that schedules a PDSCH communication that includes the one or more RARs. For example, the UE 120 may monitor for a PDCCH communication from the base station 110 addressed to a random access radio network temporary identifier (RA-RNTI) associated with the UE 120.

In some aspects, the UE 120 may monitor for the one or more second random access messages according to a pattern defined by or associated with the indication received from the base station 110. For example, the UE 120 may monitor one or more PDCCH occasions for a PDCCH portion of the one or more second random access messages. The one or more PDCCH occasions may correspond to a PCI associated with the one or more corresponding RACH occasions in which the one or more first random access message are transmitted, e.g., as described above in connection with reference number 1020.

The UE 120 may further receive the PDCCH portion of the one or more second random access messages based at least in part on monitoring the one or more PDCCH occasions. In some aspects, the PDCCH portion may include scheduling information for at least one of a PDSCH portion of the one or more second random access messages, one or more subsequent random access messages, or a combination thereof. Additionally, or alternatively, the PDCCH portion may indicate a different association between PCIs of the multiple PCIs and at least one of a PDSCH portion of the one or more second random access messages, one or more subsequent random access messages, or a combination thereof.

In some aspects, some or all RACH occasions corresponding to the one or more DL-RSs may occur before an RAR window corresponding to those RACH occasions, as described below in connection with FIGS. 11 and 12. For example, the UE 120 may perform a transmission shown by reference number 1020 for those RACH occasions before the UE 120 performs a monitoring shown by reference number 1025 for those RACH occasions. In some aspects, the UE 120 may use one RAR window with PDCCH monitoring occasions associated with all or some PCIs, as described below in connection with FIG. 11, and/or may use different RAR windows with PDCCH monitoring occasions associated with different PCI, as described below in connection with FIG. 12.

In some aspects, the UE 120 may apply a timing advance value received in a second random access message, of the one or more second random access messages from the base station 110, to all PCIs included in a TAG that includes a PCI associated with the second random access message. For example, when some or all of the multiple PCIs are included in a same TAG, the UE 120 may apply the tag to all PCIs in the TAG based on a single second random access message of the one or more second random access messages from the base station 110.

Figure 13:
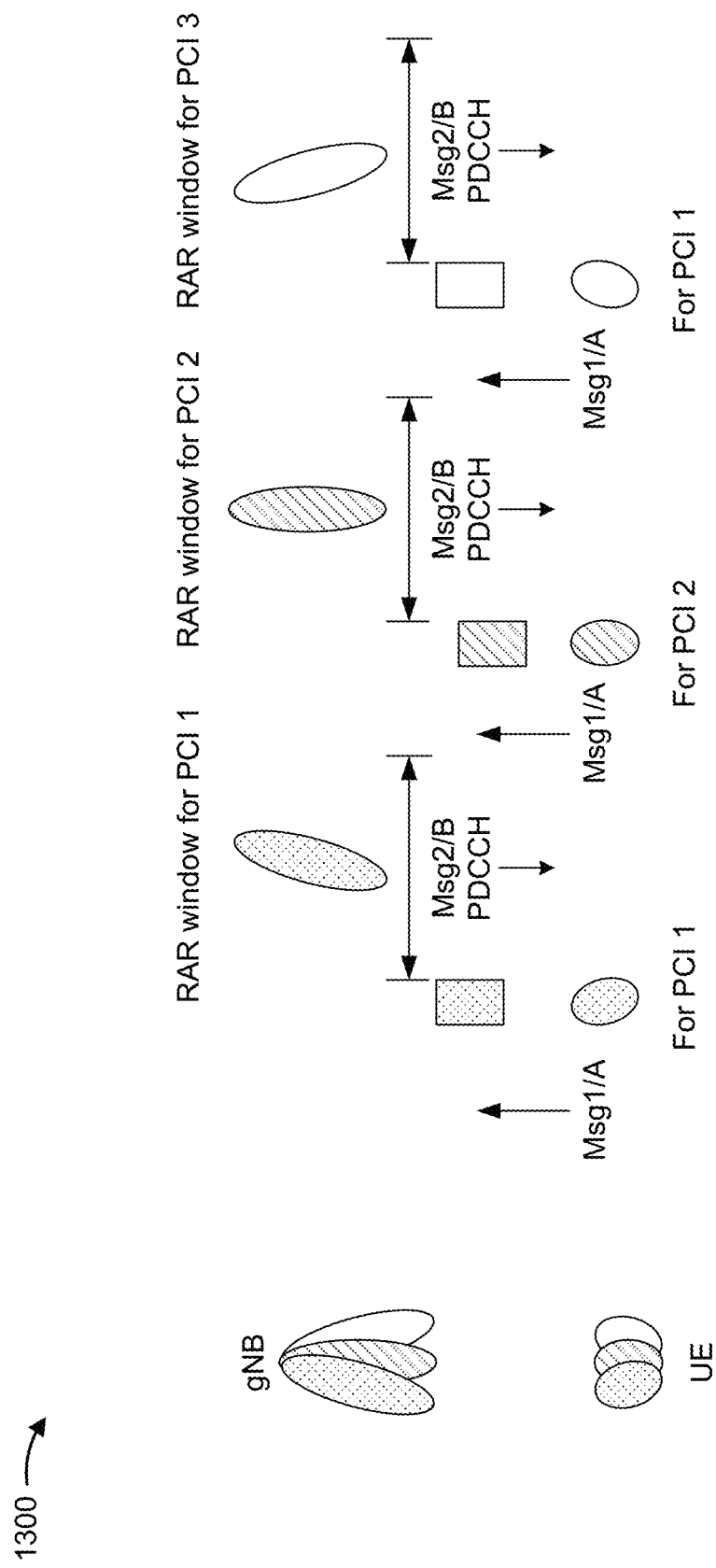
FIG. 13 is a diagram illustrating an example of single-cell sweeping of a random access message with single-cell sweeping of an RAR message in individual RAR windows per cell, in accordance with the present disclosure.

Additionally, or alternatively, one or more first RACH occasions, corresponding to a first subset of the one or more DL-RSs, may occur before a first RAR window that includes PDCCH monitoring occasions associated with a first PCI (of the multiple PCIs) that is associated with the first subset, and one or more second RACH occasions, corresponding to a second subset of the one or more DL-RSs, may occur before a second RAR window that includes PDCCH monitoring occasions associated with a second PCI (of the multiple PCIs) that is associated with the second subset and may occur after the first RAR window, as described below in connection with FIG. 13. For example, the UE 120 may perform, for the first subset, one or more transmissions shown by reference number 1020 and one or more monitorings shown by reference number 1025 before the UE 120 performs, for the second subset, one or more transmissions shown by reference number 1020 and one or more monitorings shown by reference number 1025.

As shown by reference number 1030, the UE 120 and/or the base station 110 may transmit one or more subsequent messages to each other. For example, the UE 120 may transmit or receive one or more subsequent RO messages, such as Msg3 as described above in connection with reference number 720; one or more acknowledgment messages, such as a HARQ ACK described above in connection with reference number 730; and/or the like. Additionally, or alternatively, the base station 110 may transmit one or more subsequent RO messages, such as Msg4 as described above in connection with reference number 725; one or more acknowledgment messages, such as a HARQ ACK described above in connection with reference number 840; and/or the like.

Using the procedure described in connection with FIG. 10 enables the base station 110 to establish ROs with the UE 120 across multiple PCIs. Moreover, the procedure described in connection with FIG. 10 enables the base station 110 to use the same SSB with the UE 120 on multiple PCIs. As a result, the base station 110 may be enabled to avoid PCI confusion without having to select suboptimal SSBs for ROs with the UE 120, thereby improving communication quality and reliability with the UE 120.

As indicated above, FIG. 10 is provided as an example. Other examples may differ from what is described with respect to FIG. 10.

Figure 11:
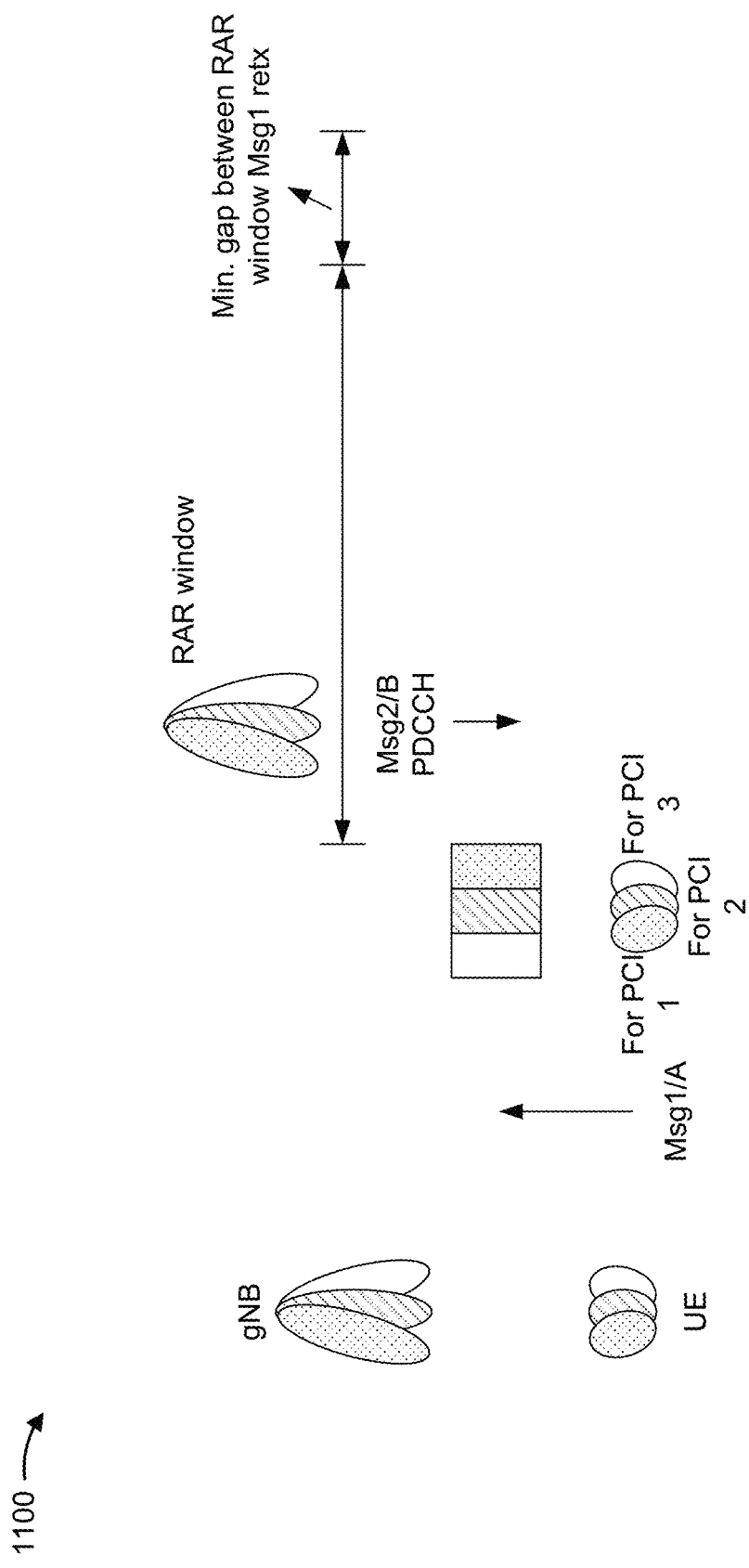
FIG. 11 is a diagram illustrating an example of cross-cell sweeping of a random access message with cross-cell sweeping of a random access response (RAR) message in a common RAR window, in accordance with the present disclosure.

FIG. 11 is a diagram illustrating an example 1100 of cross-cell sweeping of a random access message with cross-cell sweeping of an RAR message in a common RAR window, in accordance with the present disclosure. As shown in FIG. 11, a base station (gNB) (e.g., base station 110) may use a plurality of SSBs (shown as three SSBs in the example of FIG. 11). In the example of FIG. 11, the base station uses the plurality of SSBs in a plurality of ROs with a UE (e.g., UE 120). Additionally, or alternatively, the base station may use the plurality of SSBs in a plurality of ROs with a plurality of UEs.

Similar to FIG. 10, the base station may use a plurality of PCIs associated with the plurality of SSBs. In the example of FIG. 11, the base station associates different PCIs with different SSBs. Additionally, or alternatively, the base station may associate the same PCI with two or more SSBs.

Similar to FIG. 10, the UE may select the SSBs to use for RACH occasions with the base station based on one or more DL-RSs received from the base station. As shown in FIG. 11, all RACH occasions corresponding to the one or more DL-RSs occur before an RAR window corresponding to those RACH occasions. The UE may thus transmit first random access messages to the base station using all selected SSBs (regardless of which PCIs are associated with the selected SSBs) during a common time period. The UE may also monitor for second random access messages from the base station on all selected SSBs (regardless of which PCIs are associated with the selected SSBs) during the common RAR window. The RAR window may, therefore, include PDCCH monitoring occasions associated with all PCIs of the multiple PCIs.

The example of FIG. 11 depicts the serving cell using three PCIs. The techniques shown in FIG. 11 apply equally to a serving cell using more than three PCIs.

Using cross-cell occasions and a common RAR window as described in connection with FIG. 11 enables a base station to establish ROs with a UE across multiple PCIs. Moreover, the procedure described in connection with FIG. 11 enables the base station and the UE to minimize latency with respect to first and second random access messages. As a result, the base station may be enabled to avoid PCI confusion with the UE while reducing latency and without having to select suboptimal SSBs for ROs with the UE.

As indicated above, FIG. 11 is provided as an example. Other examples may differ from what is described with respect to FIG. 11.

Figure 12:
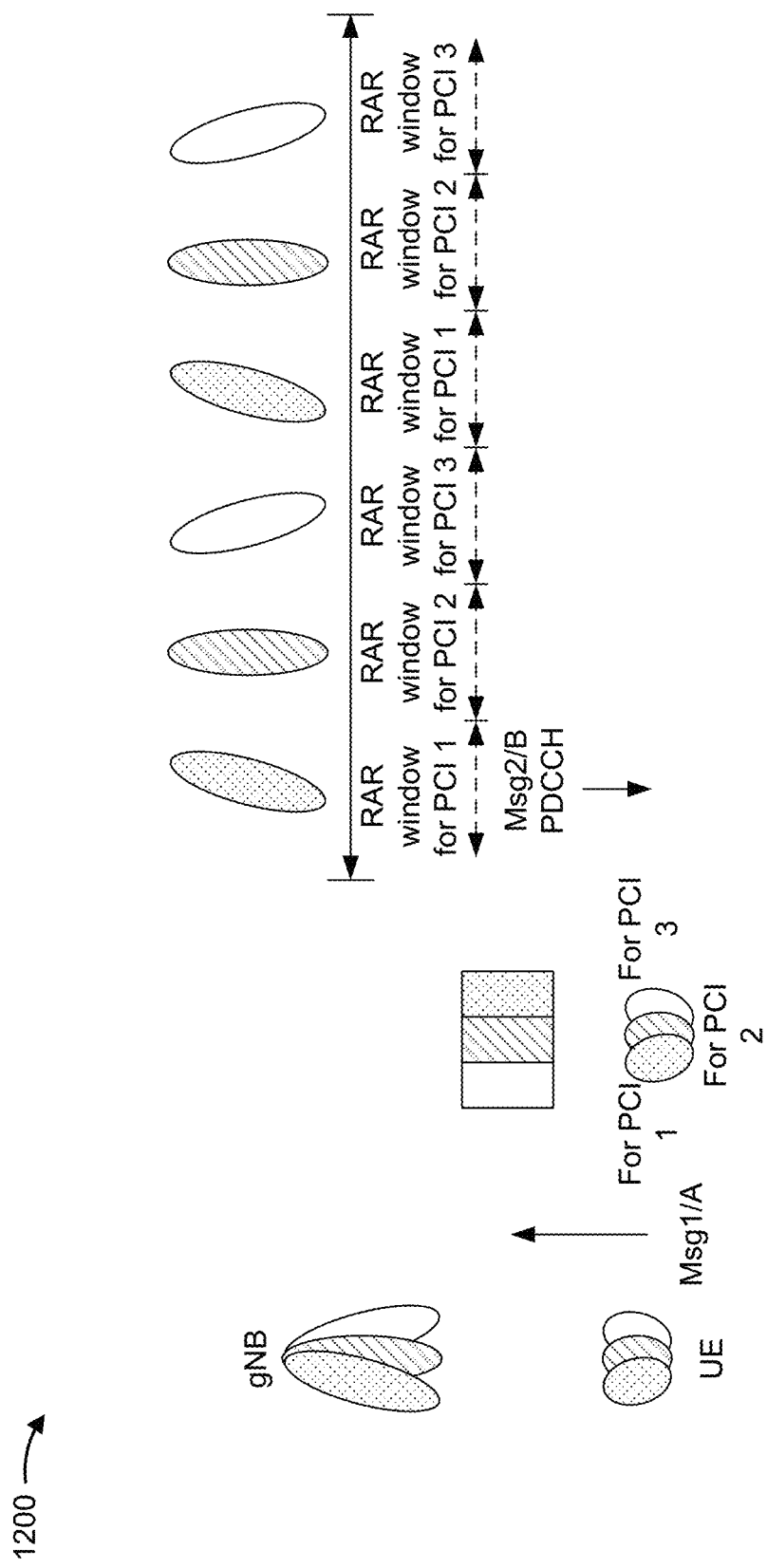
FIG. 12 is a diagram illustrating an example of cross-cell sweeping of a random access message with single-cell sweeping of an RAR message in individual RAR windows per cell, in accordance with the present disclosure.

FIG. 12 is a diagram illustrating an example 1200 of cross-cell sweeping of a random access message with single-cell sweeping of an RAR message in individual RAR windows per cell, in accordance with the present disclosure. As shown in FIG. 12, a base station (gNB) (e.g., base station 110) may use a plurality of SSBs (shown as three SSBs in the example of FIG. 12). In the example of FIG. 12, the base station uses the plurality of SSBs in a plurality of ROs with a UE (e.g., UE 120). Additionally, or alternatively, the base station may use the plurality of SSBs in a plurality of ROs with a plurality of UEs.

Similar to FIG. 10, the base station may use a plurality of PCIs associated with the plurality of SSBs. In the example of FIG. 12, the base station associates different PCIs with different SSBs. Additionally, or alternatively, the base station may associate the same PCI with two or more SSBs.

Similar to FIG. 10, the UE may select the SSBs to use for RACH occasions with the base station based on one or more DL-RSs received from the base station. As shown in FIG. 12, all RACH occasions corresponding to the one or more DL-RSs occur before a set of RAR windows corresponding to those RACH occasions. The UE may thus transmit first random access messages to the base station using all selected SSBs (regardless of which PCIs are associated with the selected SSBs) during a common time period. The UE may monitor for second random access messages from the base station during the individual RAR windows based on which PCIs are associated with the selected SSBs. The different RAR windows in the set of RAR windows may therefore include PDCCH monitoring occasions associated with different PCIs of the multiple PCIs.

The example of FIG. 12 depicts the serving cell using three PCIs. The techniques shown in FIG. 12 apply equally to a serving cell using more than three PCIs.

Using cross-cell occasions and individual RAR windows as described in connection with FIG. 12 enables a base station to establish ROs with a UE across multiple PCIs. Moreover, the procedure described in connection with FIG. 12 enables the base station and the UE to minimize latency of first random access messages while improving quality and/or reliability for second random access messages. As a result, the base station may be enabled to avoid PCI confusion with the UE while balancing latency with quality and/or reliability and without having to select suboptimal SSBs for ROs with the UE.

As indicated above, FIG. 12 is provided as an example. Other examples may differ from what is described with respect to FIG. 12.

FIG. 13 is a diagram illustrating an example 1300 of single-cell sweeping of a random access message with single-cell sweeping of an RAR message in individual RAR windows per cell, in accordance with the present disclosure. As shown in FIG. 13, a base station (gNB) (e.g., base station 110) may use a plurality of SSBs (shown as three SSBs in the example of FIG. 13). In the example of FIG. 13, the base station uses the plurality of SSBs in a plurality of ROs with a UE (e.g., UE 120). Additionally, or alternatively, the base station may use the plurality of SSBs in a plurality of ROs with a plurality of UEs.

Similar to FIG. 10, the base station may use a plurality of PCIs associated with the plurality of SSBs. In the example of FIG. 13, the base station associates different PCIs with different SSBs. Additionally, or alternatively, the base station may associate the same PCI with two or more SSBs.

Similar to FIG. 10, the UE may select the SSBs to use for RACH occasions with the base station based on one or more DL-RSs received from the base station. As shown in FIG. 13, one or more first RACH occasions, corresponding to a first subset of the one or more DL-RSs, occur before a first RAR window, and one or more second RACH occasions, corresponding to a second subset of the one or more DL-RSs, occur before a second RAR window. The UE may thus transmit first random access messages to the base station using a subset of selected SSBs associated with a first PCI before the first RAR window and may transmit first random access messages to the base station using a subset of selected SSBs associated with a second PCI after the first RAR window. Similarly, the UE may monitor for second random access messages from the base station on the subset of selected SSBs associated with the first PCI during the first RAR window and may monitor for second random access messages from the base station on the subset of selected SSBs associated with the second PCI during the second RAR window. Accordingly, the first RAR window includes PDCCH monitoring occasions associated with a first PCI, of the multiple PCIs, that is associated with the first subset, and the second RAR window includes PDCCH monitoring occasions associated with a second PCI, of the multiple PCIs, that is associated with the second subset and occur after the first RAR window.

The example of FIG. 13 further depicts the UE transmitting first random access messages to the base station using a subset of selected SSBs associated with a third PCI after the second RAR window and monitoring for second random access messages from the base station on the subset of selected SSBs associated with the third PCI during a third RAR window. The techniques shown in FIG. 13 apply equally to a serving cell using more than three PCIs.

Using single-cell occasions and individual RAR windows as described in connection with FIG. 13 enables a base station to establish ROs with a UE across multiple PCIs. Moreover, the procedure described in connection with FIG. 13 enables the base station and the UE to maximize quality and/or reliability with respect to first and second random access messages. As a result, the base station may be enabled to avoid PCI confusion with the UE while improving quality and/or reliability and without having to select suboptimal SSBs for ROs with the UE.

As indicated above, FIG. 13 is provided as an example. Other examples may differ from what is described with respect to FIG. 13.

Figure 14:
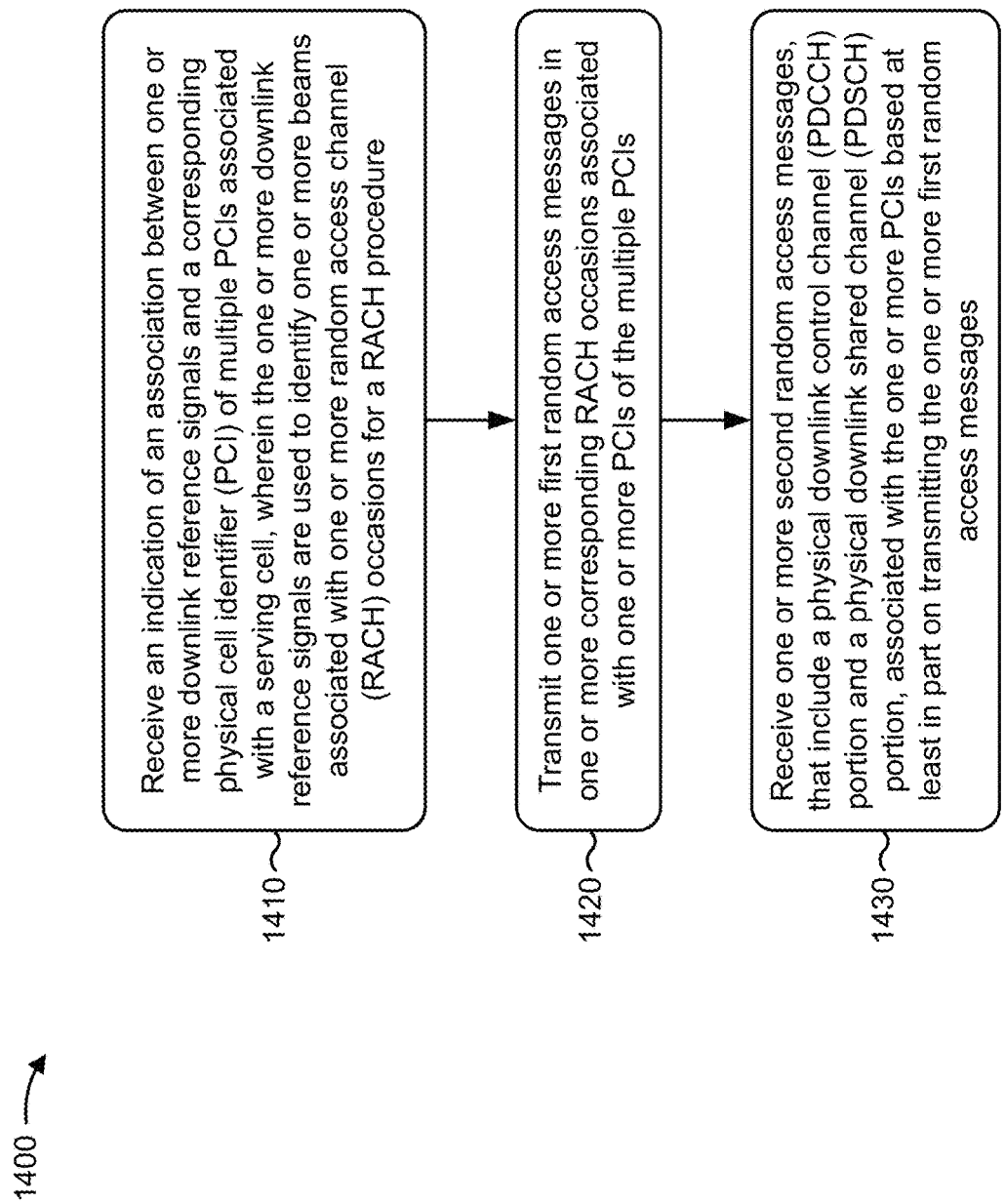
FIG. 14 is a diagram illustrating an example process performed, for example, by a user equipment, in accordance with the present disclosure.

FIG. 14 is a diagram illustrating an example process 1400 performed, for example, by a UE, in accordance with the present disclosure. Example process 1400 is an example where the UE (e.g., UE 120 and/or the like) performs operations associated with techniques for RACH beam sweeping across multiple PCIs of a serving cell.

As shown in FIG. 14, in some aspects, process 1400 may include receiving an indication of an association between one or more DL-RSs and a corresponding PCI of multiple PCIs associated with a serving cell (block 1410). For example, the UE (e.g., using receive processor 258, transmit processor 264, controller/processor 280, memory 282, and/or the like) may receive the indication of the association between the one or more DL-RSs and the corresponding PCI of multiple PCIs associated with the serving cell, as described above. In some aspects, the one or more DL-RSs are used to identify one or more beams associated with one or more RACH occasions for a RACH procedure. In some aspects, the one or more DL-RSs are included in a set of DL-RSs, such as a set of DL-RSs indicated in a beam sweep pattern and/or in a broader set of reference signals (RSs) including a measurement set of RSs used in the RACH procedure.

As further shown in FIG. 14, in some aspects, process 1400 may include transmitting one or more first random access messages in one or more corresponding RACH occasions associated with one or more PCIs of the multiple PCIs (block 1420). For example, the UE (e.g., using receive processor 258, transmit processor 264, controller/processor 280, memory 282, and/or the like) may transmit the one or more first random access messages in the one or more corresponding RACH occasions associated with the one or more PCIs of the multiple PCIs, as described above.

As further shown in FIG. 14, in some aspects, process 1400 may include receiving one or more second random access messages, that include a PDCCH portion and a PDSCH portion, associated with the one or more PCIs based at least in part on transmitting the one or more first random access messages (block 1430). For example, the UE (e.g., using receive processor 258, transmit processor 264, controller/processor 280, memory 282, and/or the like) may receive the one or more second random access messages, that include a PDCCH portion and a PDSCH portion, associated with the one or more PCIs based at least in part on transmitting the one or more first random access messages, as described above.

Process 1400 may include additional aspects, such as any single aspect or any combination of aspects described below and/or in connection with one or more other processes described elsewhere herein.

In a first aspect, the indication further indicates a beam sweeping pattern, for the one or more downlink reference signals, that indicates the association between the one or more downlink reference signals and the corresponding one or more PCIs of the multiple PCIs associated with the serving cell.

In a second aspect, alone or in combination with the first aspect, a first downlink reference signal included in the one or more downlink reference signals is associated with a first PCI of the serving cell and a second downlink reference signal included in the one or more downlink reference signals is associated with a second PCI of the serving cell.

In a third aspect, alone or in combination with one or more of the first and second aspects, each downlink reference signal, in the one or more downlink reference signals, corresponds to a particular PCI of the multiple PCIs associated with the serving cell.

In a fourth aspect, alone or in combination with one or more of the first through third aspects, all RACH occasions corresponding to the one or more downlink reference signals occur before an RAR window corresponding to those RACH occasions, the RAR window includes PDCCH monitoring occasions associated with all PCIs of the multiple PCIs.

In a fifth aspect, alone or in combination with one or more of the first through fourth aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In a sixth aspect, alone or in combination with one or more of the first through fifth aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In a seventh aspect, alone or in combination with one or more of the first through sixth aspects, the indication is received in a radio resource configuration message for contention-free random access, a PDCCH order message that triggers the RACH procedure, or a combination thereof.

In an eighth aspect, alone or in combination with one or more of the first through seventh aspects, the indication further indicates an association between one or more PDCCH monitoring occasions, of a set of PDCCH monitoring occasions used for the RACH procedure, and a PCI of the multiple PCIs associated with the serving cell.

In a ninth aspect, alone or in combination with one or more of the first through eighth aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In a tenth aspect, alone or in combination with one or more of the first through ninth aspects, process 1400 may further include monitoring one or more PDCCH occasions for the PDCCH portion of the one or more second random access messages, wherein the one or more PDCCH occasions correspond to a PCI associated with the one or more corresponding RACH occasions in which the one or more first random access message are transmitted.

In an eleventh aspect, alone or in combination with one or more of the first through tenth aspects, process 1400 may further include receiving a PDCCH portion of a second random access message of the one or more random access messages based at least in part on monitoring the one or more PDCCH occasions, wherein the PDCCH portion of the second random access message includes scheduling information for at least one of a PDSCH portion of the second random access message, one or more subsequent random access messages, or a combination thereof.

In a twelfth aspect, alone or in combination with one or more of the first through eleventh aspects, process 1400 may further include receiving a PDCCH portion of a second random access message of the one or more random access messages based at least in part on monitoring the one or more PDCCH occasions, wherein the PDCCH portion of the second random access message indicates a different association between PCIs of the multiple PCIs and at least one of a PDSCH portion of the second random access message, one or more subsequent random access messages, or a combination thereof.

In a thirteenth aspect, alone or in combination with one or more of the first through twelfth aspects, the multiple PCIs are included in a same timing advance group.

In a fourteenth aspect, alone or in combination with one or more of the first through thirteenth aspects, different PCIs, included in the multiple PCIs, are associated with different timing advance groups.

In a fifteenth aspect, alone or in combination with one or more of the first through fourteenth aspects, the multiple PCIs are included in a same timing advance group or in different timing advance groups based at least in part on a purpose of the RACH procedure.

In a sixteenth aspect, alone or in combination with one or more of the first through fifteenth aspects, process 1400 may further include applying a timing advance value received in a second random access message, of the one or more second random access messages, to all PCIs included in a timing advance group that includes a PCI associated with the second random access message.

In a seventeenth aspect, alone or in combination with one or more of the first through sixteenth aspects, the multiple PCIs are associated with co-located base stations or transmit receive points.

In an eighteenth aspect, alone or in combination with one or more of the first through seventeenth aspects, different PCIs, included in the multiple PCIs, are associated with base stations or transmit receive points in different locations.

In a nineteenth aspect, alone or in combination with one or more of the first through eighteenth aspects, the one or more downlink reference signals includes at least one of a set of synchronization signal blocks, a set of channel state information reference signals, or a combination thereof.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
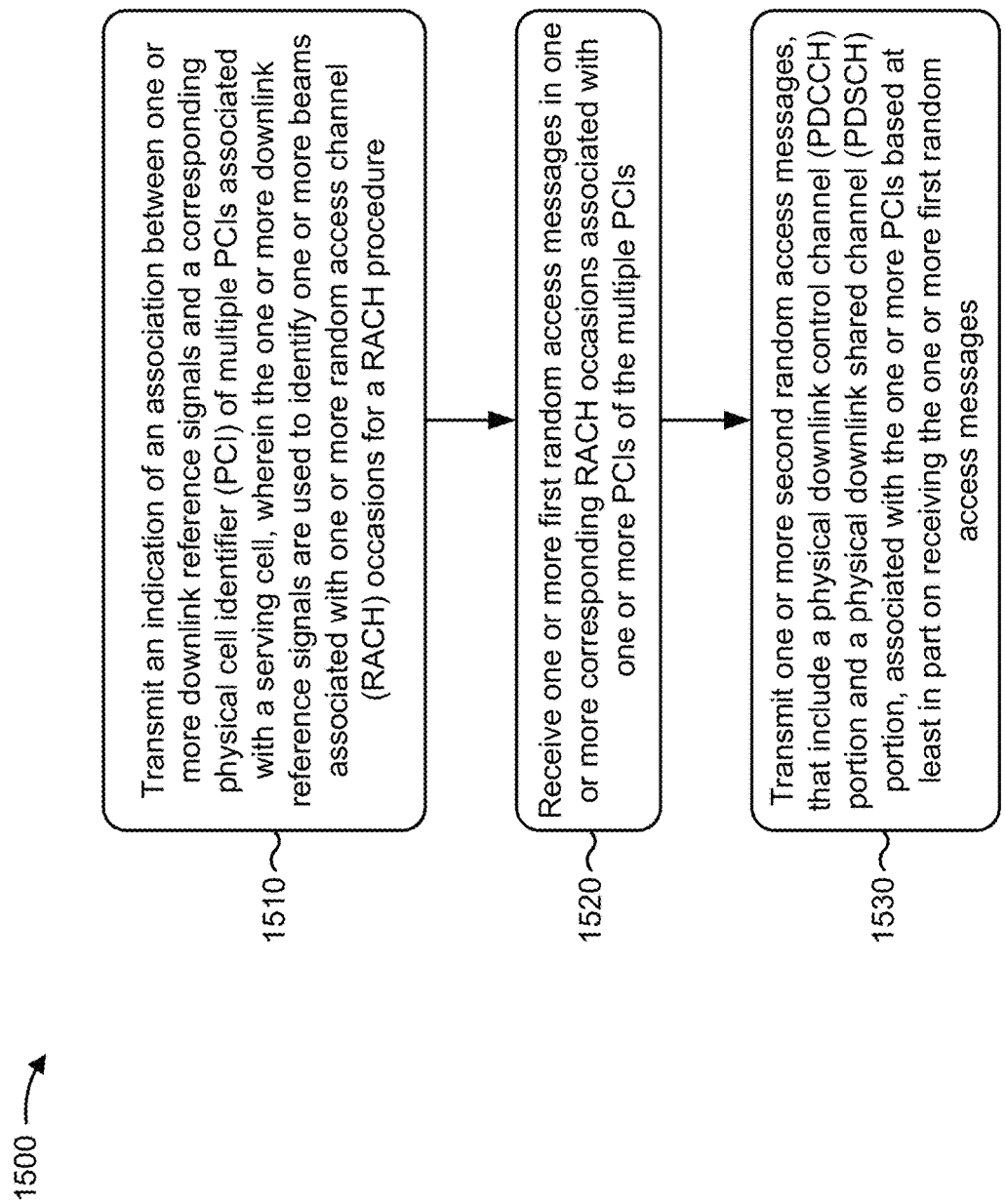
FIG. 15 is a diagram illustrating an example process performed, for example, by a base station, in accordance with the present disclosure.

FIG. 15 is a diagram illustrating an example process 1500 performed, for example, by a base station, in accordance with the present disclosure. Example process 1500 is an example where the base station (e.g., base station 110 and/or the like) performs operations associated with techniques for RACH beam sweeping across multiple PCIs of a serving cell.

As shown in FIG. 15, in some aspects, process 1500 may include transmitting an indication of an association between one or more DL-RSs and a corresponding PCI of multiple PCIs associated with a serving cell (block 1510). For example, the base station (e.g., using receive processor 238, controller/processor 240, memory 242, and/or the like) may transmit the indication of the association between one or more DL-RSs and the corresponding PCI of multiple PCIs associated with the serving cell, as described above. In some aspects, the one or more DL-RSs are used to identify one or more beams associated with one or more RACH occasions for a RACH procedure. In some aspects, the one or more DL-RSs are included in a set of DL-RSs, such as a set of DL-RSs indicated in a beam sweep pattern and/or in a broader set of RSs including a measurement set of RSs used in the RACH procedure.

As further shown in FIG. 15, in some aspects, process 1500 may include receiving one or more first random access messages in one or more corresponding RACH occasions associated with one or more PCIs of the multiple PCIs (block 1520). For example, the user equipment (e.g., using receive processor 238, controller/processor 240, memory 242, and/or the like) may receive one or more first random access messages in one or more corresponding RACH occasions associated with one or more PCIs of the multiple PCIs, as described above.

As further shown in FIG. 15, in some aspects, process 1500 may include transmitting one or more second random access messages, that include a PDCCH portion and a PDSCH portion, associated with the one or more PCIs based at least in part on receiving the one or more first random access messages (block 1530). For example, the user equipment (e.g., using receive processor 238, controller/processor 240, memory 242, and/or the like) may transmit one or more second random access messages, that include a PDCCH portion and a PDSCH portion, associated with the one or more PCIs based at least in part on receiving the one or more first random access messages, as described above.

Process 1500 may include additional aspects, such as any single aspect or any combination of aspects described below and/or in connection with one or more other processes described elsewhere herein.

In a first aspect, the indication further indicates a beam sweeping pattern, for the one or more downlink reference signals, that indicates the association between the one or more downlink reference signals and the corresponding one or more PCIs of the multiple PCIs associated with the serving cell.

In a second aspect, alone or in combination with the first aspect, a first downlink reference signal included in the one or more downlink reference signals is associated with a first PCI of the serving cell and a second downlink reference signal included in the one or more downlink reference signals is associated with a second PCI of the serving cell.

In a third aspect, alone or in combination with one or more of the first and second aspects, each downlink reference signal, in the one or more downlink reference signals, corresponds to a particular PCI of the multiple PCIs associated with the serving cell.

In a fourth aspect, alone or in combination with one or more of the first through third aspects, all RACH occasions corresponding to the one or more downlink reference signals occur before an RAR window corresponding to those RACH occasions, the RAR window includes PDCCH monitoring occasions associated with all PCIs of the multiple PCIs.

In a fifth aspect, alone or in combination with one or more of the first through fourth aspects, all RACH occasions corresponding to the one or more downlink reference signals occur before a set of RAR windows corresponding to those RACH occasions, different RAR windows in the set of RAR windows include PDCCH monitoring occasions associated with different PCIs of the multiple PCIs.

In a sixth aspect, alone or in combination with one or more of the first through fifth aspects, one or more first RACH occasions, corresponding to a first subset of the one or more downlink reference signals, occur before a first RAR window that includes PDCCH monitoring occasions associated with a first PCI, of the multiple PCIs, that is associated with the first subset, and one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

In a seventh aspect, alone or in combination with one or more of the first through sixth aspects, the indication is transmitted in a radio resource configuration message for contention-free random access, a PDCCH order message that triggers the RACH procedure, or a combination thereof.

In an eighth aspect, alone or in combination with one or more of the first through seventh aspects, the indication further indicates an association between one or more PDCCH monitoring occasions, of a set of PDCCH monitoring occasions used for the RACH procedure, and a PCI of the multiple PCIs associated with the serving cell.

In a ninth aspect, alone or in combination with one or more of the first through eighth aspects, a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

In a tenth aspect, alone or in combination with one or more of the first through ninth aspects, process 1500 may further include transmitting the PDCCH portion in one or more PDCCH occasions, wherein the one or more PDCCH occasions corresponding to a PCI associated with the one or more corresponding RACH occasions in which the one or more first random access message are received.

In an eleventh aspect, alone or in combination with one or more of the first through tenth aspects, the PDCCH portion includes scheduling information for at least one of the PDSCH portion of, one or more subsequent random access messages, or a combination thereof.

In a twelfth aspect, alone or in combination with one or more of the first through eleventh aspects, the PDCCH portion indicates a different association between PCIs of the multiple PCIs and at least one of the PDSCH portion, one or more subsequent random access messages, or a combination thereof.

In a thirteenth aspect, alone or in combination with one or more of the first through twelfth aspects, the multiple PCIs are included in a same timing advance group.

In a fourteenth aspect, alone or in combination with one or more of the first through thirteenth aspects, different PCIs, included in the multiple PCIs, are associated with different timing advance groups.

In a fifteenth aspect, alone or in combination with one or more of the first through fourteenth aspects, the multiple PCIs are included in a same timing advance group or in different timing advance groups based at least in part on a purpose of the RACH procedure.

In a sixteenth aspect, alone or in combination with one or more of the first through fifteenth aspects, the multiple PCIs are associated with co-located base stations or transmit receive points.

In a seventeenth aspect, alone or in combination with one or more of the first through sixteenth aspects, different PCIs, included in the multiple PCIs, are associated with base stations or transmit receive points in different locations.

In an eighteenth aspect, alone or in combination with one or more of the first through seventeenth aspects, the one or more downlink reference signals includes at least one of a set of synchronization signal blocks, a set of channel state information reference signals, or a combination thereof.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
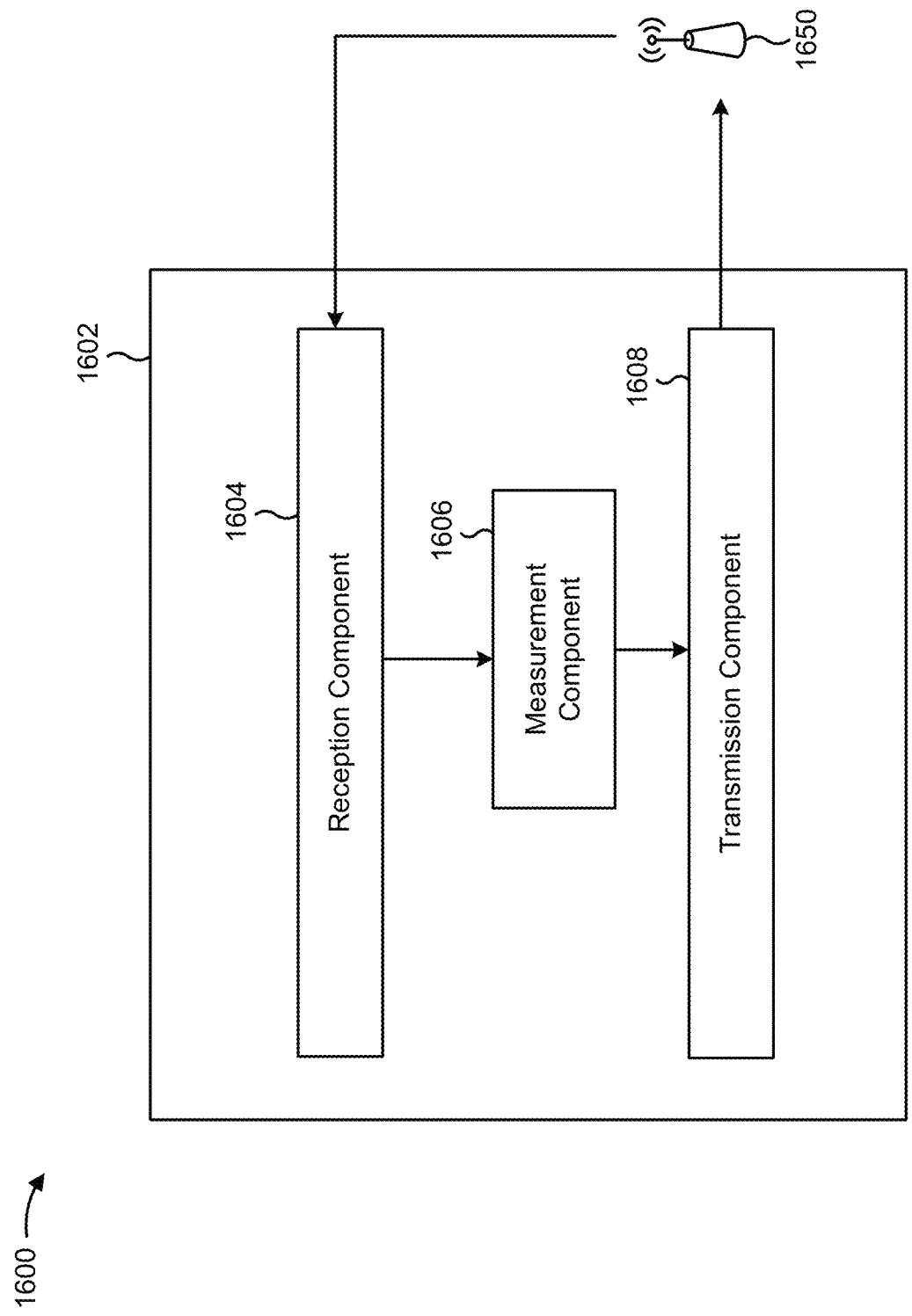
FIGS. 16-17 are data flow diagrams illustrating the data flow between different components in example apparatuses, in accordance with the present disclosure.

FIG. 16 is a data flow diagram 1600 illustrating the data flow between different components in an example apparatus 1602. The apparatus 1602 may be a UE (e.g., UE 120). In some aspects, the apparatus 1602 includes a reception component 1604, a measurement component 1606, and/or a transmission component 1608. As shown, the apparatus 1602 may communicate with another apparatus 1650 (e.g., a UE, a base station, and/or another wireless communication device) using the reception component 1604 and/or the transmission component 1608.

The reception component 1604 may receive, from the second apparatus 1650 (e.g., a base station) an indication of an association between one or more DL-RSs and a corresponding PCI of multiple PCIs associated with a serving cell. In some aspects, the one or more DL-RSs may be used to identify one or more beams associated with one or more RACH occasions for a RACH procedure. The measurement component 1606 may measure the one or more DL-RSs and, based on the measurement, identify or select one or more beams (or SSBs) for the RACH procedure. For example, the measurement component 1606 may identify or select the one or more beams (or SSBs) based on indicators of signal quality and/or reliability (e.g., CQIs and/or the like).

The transmission component 1608 may transmit, to the second apparatus 1650 (e.g., the base station), one or more first random access messages in one or more corresponding RACH occasions associated with one or more PCIs of the multiple PCIs. The transmission component 1608 may use the beams (or SSBs) identified or selected by the measurement component 1606 for the transmission(s).

Based at least in part on transmitting the one or more first random access messages, the reception component 1604 may receive, from the second apparatus 1650 (e.g., the base station), one or more second random access messages, that include a PDCCH portion and a PDSCH portion, associated with the one or more PCIs. Based at least in part on receive the one or more second random access messages, the apparatus 1602 may transmit subsequent messages to and/or receive subsequent messages from the second apparatus 1650 (e.g., the base station). For example, the transmission component 1608 may transmit, to the second apparatus 1650 (e.g., the base station), one or more subsequent RO messages, such as Msg3 as described above in connection with reference number 720; one or more acknowledgment messages, such as a HARQ ACK described above in connection with reference number 730; and/or the like.

Additionally, or alternatively, the reception component 1604 may receive, from the second apparatus 1650 (e.g., the base station), one or more subsequent RO messages, such as Msg4 as described above in connection with reference number 725; one or more acknowledgment messages, such as a HARQ ACK described above in connection with reference number 840; and/or the like.

The apparatus may include additional components that perform each of the blocks of the algorithm in the aforementioned process 1400 of FIG. 14 and/or the like. Each block in the aforementioned process 1400 of FIG. 14 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of components (e.g., one or more components) shown in FIG. 16 may perform one or more functions described as being performed by another set of components shown in FIG. 16.

Figure 17:
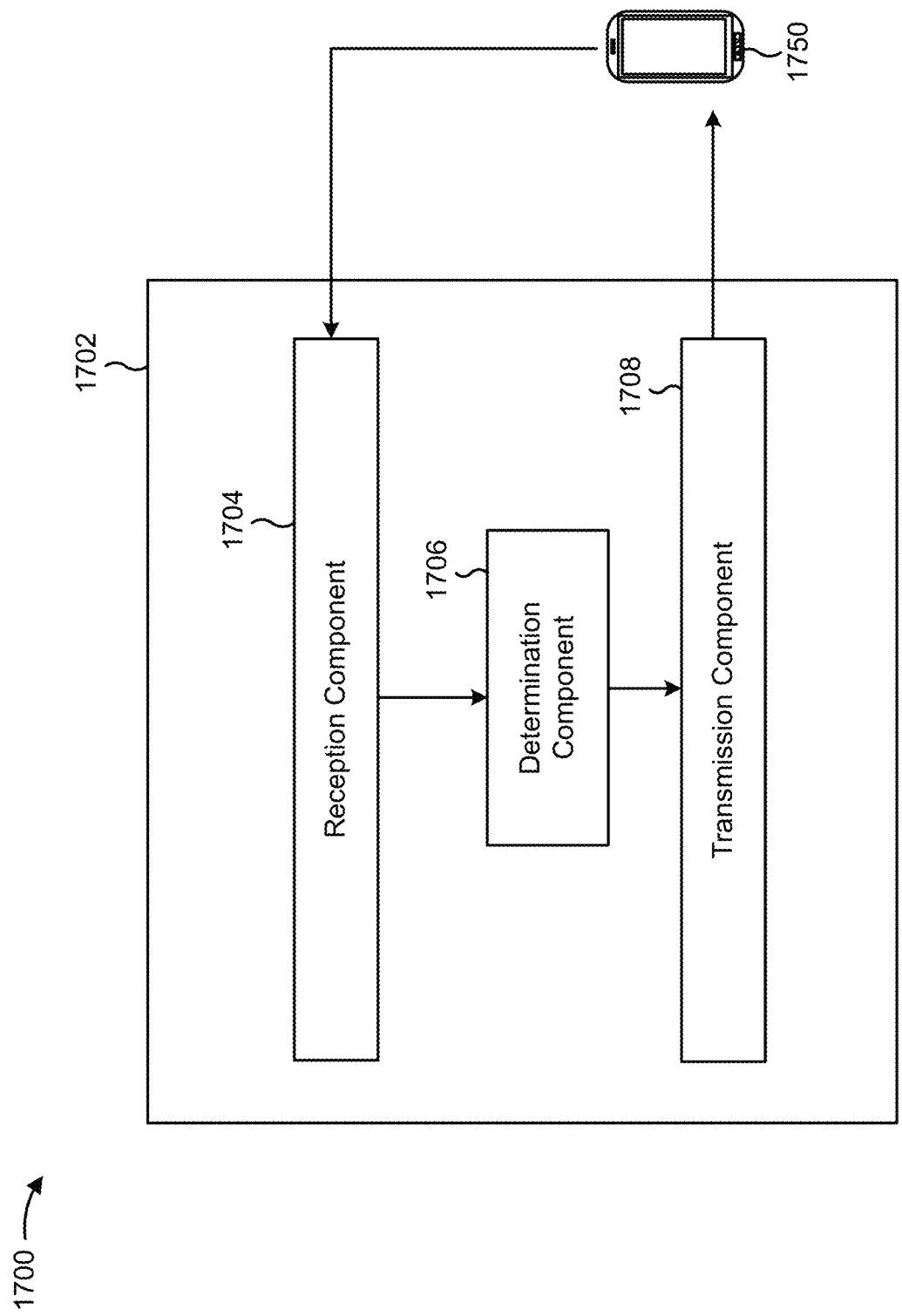

FIG. 17 is a data flow diagram 1700 illustrating the data flow between different components in an example apparatus 1702. The apparatus 1702 may be a base station (e.g., base station 110). In some aspects, the apparatus 1702 includes a reception component 1704, a determination component 1706, and/or a transmission component 1708. As shown, the apparatus 1702 may communicate with another apparatus 1750 (e.g., a UE, a base station, and/or another wireless communication device) using the reception component 1704 and/or the transmission component 1708.

The determination component 1706 may determine an association between one or more DL-RSs and a corresponding PCI of multiple PCIs associated with a serving cell. In some aspects, the one or more DL-RSs may be used to identify one or more beams associated with one or more RACH occasions for a RACH procedure.

The transmission component 1708 may transmit, to the second apparatus 1750 (e.g., a UE), an indication of the association. Based at least in part on transmitting the indication, the reception component 1704 may receive, from the second apparatus 1750 (e.g., the UE), one or more first random access messages in one or more corresponding RACH occasions associated with one or more PCIs of the multiple PCIs.

Based at least in part on receiving the one or more first random access messages, the transmission component 1708 may transmit, to the second apparatus 1750 (e.g., the UE), one or more second random access messages, that include a PDCCH portion and a PDSCH portion, associated with the one or more PCIs. Based at least in part on transmitting the one or more second random access messages, the apparatus 1702 may receive subsequent messages from and/or transmit subsequent messages to the second apparatus 1750 (e.g., the UE). For example, the reception component 1704 may receive, from the second apparatus 1750 (e.g., the UE), one or more subsequent RO messages, such as Msg3 as described above in connection with reference number 720; one or more acknowledgment messages, such as a HARQ ACK described above in connection with reference number 730; and/or the like. Additionally, or alternatively, the transmission component 1708 may transmit, to the second apparatus 1750 (e.g., the UE), one or more subsequent RO messages, such as Msg4 as described above in connection with reference number 725; one or more acknowledgment messages, such as a HARQ ACK described above in connection with reference number 840; and/or the like.

The apparatus may include additional components that perform each of the blocks of the algorithm in the aforementioned process 1500 of FIG. 15 and/or the like. Each block in the aforementioned process 1500 of FIG. 15 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of components (e.g., one or more components) shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure; transmitting one or more first random access messages in one or more corresponding RACH occasions associated with one or more PCIs of the multiple PCIs; and receiving one or more second random access messages, that include a physical downlink control channel (PDCCH) portion and a physical downlink shared channel (PDSCH) portion, associated with the one or more PCIs based at least in part on transmitting the one or more first random access messages.

Aspect 2: The method of Aspect 1, wherein the indication further indicates a beam sweeping pattern, for the one or more downlink reference signals, that indicates the association between the one or more downlink reference signals and the corresponding one or more PCIs of the multiple PCIs associated with the serving cell.

Aspect 3: The method of any of Aspects 1-2, wherein a first downlink reference signal included in the one or more downlink reference signals is associated with a first PCI of the serving cell and a second downlink reference signal included in the one or more downlink reference signals is associated with a second PCI of the serving cell.

Aspect 4: The method of any of Aspects 1-3, wherein each downlink reference signal, in the one or more downlink reference signals, corresponds to a particular PCI of the multiple PCIs associated with the serving cell.

Aspect 5: The method of any of Aspects 1-4, wherein all RACH occasions corresponding to the one or more downlink reference signals occur before a random access response (RAR) window corresponding to those RACH occasions, wherein the RAR window includes PDCCH monitoring occasions associated with all PCIs of the multiple PCIs.

Aspect 6: The method of any of Aspects 1-4, wherein all RACH occasions corresponding to the one or more downlink reference signals occur before a set of random access response (RAR) windows corresponding to those RACH occasions, wherein different RAR windows in the set of RAR windows include PDCCH monitoring occasions associated with different PCIs of the multiple PCIs.

Aspect 7: The method of any of Aspects 1-4, wherein one or more first RACH occasions, corresponding to a first subset of the one or more downlink reference signals, occur before a first random access response (RAR) window that includes PDCCH monitoring occasions associated with a first PCI, of the multiple PCIs, that is associated with the first subset, and wherein one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

Aspect 8: The method of any of Aspects 1-7, wherein the indication is received in a radio resource configuration message for contention-free random access, a PDCCH order message that triggers the RACH procedure, or a combination thereof.

Aspect 9: The method of any of Aspects 1-8, wherein the indication further indicates an association between one or more PDCCH monitoring occasions, of a set of PDCCH monitoring occasions used for the RACH procedure, and a PCI of the multiple PCIs associated with the serving cell.

Aspect 10: The method of Aspect 9, wherein a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

Aspect 11: The method of any of Aspects 1-10, further comprising monitoring one or more PDCCH occasions for the PDCCH portion of the one or more second random access messages, wherein the one or more PDCCH occasions correspond to a PCI associated with the one or more corresponding RACH occasions in which the one or more first random access message are transmitted.

Aspect 12: The method of Aspect 11, further comprising receiving a PDCCH portion of a second random access message of the one or more random access messages based at least in part on monitoring the one or more PDCCH occasions, wherein the PDCCH portion of the second random access message includes scheduling information for at least one of a PDSCH portion of the second random access message, one or more subsequent random access messages, or a combination thereof.

Aspect 13: The method of any of Aspects 11-12, further comprising receiving a PDCCH portion of a second random access message of the one or more random access messages based at least in part on monitoring the one or more PDCCH occasions, wherein the PDCCH portion of the second random access message indicates a different association between PCIs of the multiple PCIs and at least one of a PDSCH portion of the second random access message, one or more subsequent random access messages, or a combination thereof.

Aspect 14: The method of any of Aspects 1-13, wherein the multiple PCIs are included in a same timing advance group.

Aspect 15: The method of any of Aspects 1-13, wherein different PCIs, included in the multiple PCIs, are associated with different timing advance groups.

Aspect 16: The method of any of Aspects 1-15, wherein the multiple PCIs are included in a same timing advance group or in different timing advance groups based at least in part on a purpose of the RACH procedure.

Aspect 17: The method of any of Aspects 1-16, further comprising applying a timing advance value received in a second random access message, of the one or more second random access messages, to all PCIs included in a timing advance group that includes a PCI associated with the second random access message.

Aspect 18: The method of any of Aspects 1-17, wherein the multiple PCIs are associated with co-located base stations or transmit receive points.

Aspect 19: The method of any of Aspects 1-17, wherein different PCIs, included in the multiple PCIs, are associated with base stations or transmit receive points in different locations.

Aspect 20: The method of any of Aspects 1-19, wherein the one or more downlink reference signals includes at least one of a set of synchronization signal blocks, a set of channel state information reference signals, or a combination thereof.

Aspect 21: A method of wireless communication performed by a base station, comprising: transmitting an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure; receiving one or more first random access messages in one or more corresponding RACH occasions associated with one or more PCIs of the multiple PCIs; and transmitting one or more second random access messages, that include a physical downlink control channel (PDCCH) portion and a physical downlink shared channel (PDSCH) portion, associated with the one or more PCIs based at least in part on receiving the one or more first random access messages.

Aspect 22: The method of Aspect 21, wherein the indication further indicates a beam sweeping pattern, for the one or more downlink reference signals, that indicates the association between the one or more downlink reference signals and the corresponding one or more PCIs of the multiple PCIs associated with the serving cell.

Aspect 23: The method of any of Aspects 21-22, wherein a first downlink reference signal included in the one or more downlink reference signals is associated with a first PCI of the serving cell and a second downlink reference signal included in the one or more downlink reference signals is associated with a second PCI of the serving cell.

Aspect 24: The method of any of Aspects 21-23, wherein each downlink reference signal, in the one or more downlink reference signals, corresponds to a particular PCI of the multiple PCIs associated with the serving cell.

Aspect 25: The method of any of Aspects 21-24, wherein all RACH occasions corresponding to the one or more downlink reference signals occur before a random access response (RAR) window corresponding to those RACH occasions, wherein the RAR window includes PDCCH monitoring occasions associated with all PCIs of the multiple PCIs.

Aspect 26: The method of any of Aspects 21-24, wherein all RACH occasions corresponding to the one or more downlink reference signals occur before a set of random access response (RAR) windows corresponding to those RACH occasions, wherein different RAR windows in the set of RAR windows include PDCCH monitoring occasions associated with different PCIs of the multiple PCIs.

Aspect 27: The method of any of Aspects 21-24, wherein one or more first RACH occasions, corresponding to a first subset of the one or more downlink reference signals, occur before a first random access response (RAR) window that includes PDCCH monitoring occasions associated with a first PCI, of the multiple PCIs, that is associated with the first subset, and wherein one or more second RACH occasions, corresponding to a second subset of the one or more downlink reference signals, occur before a second RAR window that includes PDCCH monitoring occasions associated with a second PCI, of the multiple PCIs, that is associated with the second subset and occur after the first RAR window.

Aspect 28: The method of any of Aspects 21-27, wherein the indication is transmitted in a radio resource configuration message for contention-free random access, a PDCCH order message that triggers the RACH procedure, or a combination thereof.

Aspect 29: The method of any of Aspects 21-28, wherein the indication further indicates an association between one or more PDCCH monitoring occasions, of a set of PDCCH monitoring occasions used for the RACH procedure, and a PCI of the multiple PCIs associated with the serving cell.

Aspect 30: The method of any of Aspects 21-29, wherein a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

Aspect 31: The method of any of Aspects 21-30, further comprising transmitting the PDCCH portion in one or more PDCCH occasions, wherein the one or more PDCCH occasions corresponding to a PCI associated with the one or more corresponding RACH occasions in which the one or more first random access message are received.

Aspect 32: The method of Aspect 31, wherein the PDCCH portion includes scheduling information for at least one of the PDSCH portion of, one or more subsequent random access messages, or a combination thereof.

Aspect 33: The method of any of Aspects 31-32, wherein the PDCCH portion indicates a different association between PCIs of the multiple PCIs and at least one of the PDSCH portion, one or more subsequent random access messages, or a combination thereof.

Aspect 34: The method of any of Aspects 21-33, wherein the multiple PCIs are included in a same timing advance group.

Aspect 35: The method of any of Aspects 21-33, wherein different PCIs, included in the multiple PCIs, are associated with different timing advance groups.

Aspect 36: The method of any of Aspects 21-35, wherein the multiple PCIs are included in a same timing advance group or in different timing advance groups based at least in part on a purpose of the RACH procedure.

Aspect 37: The method of any of Aspects 21-36, wherein the multiple PCIs are associated with co-located base stations or transmit receive points.

Aspect 38: The method of any of Aspects 21-36, wherein different PCIs, included in the multiple PCIs, are associated with base stations or transmit receive points in different locations.

Aspect 39: The method of any of Aspects 21-38, wherein the one or more downlink reference signals includes at least one of a set of synchronization signal blocks, a set of channel state information reference signals, or a combination thereof.

Aspect 40: An apparatus for wireless communication at a device, comprising a processor; memory coupled with the processor; and instructions stored in the memory and executable by the processor to cause the apparatus to perform the method of one or more Aspects of Aspects 1-20.

Aspect 41: A device for wireless communication, comprising a memory and one or more processors coupled to the memory, the memory and the one or more processors configured to perform the method of one or more Aspects of Aspects 1-20.

Aspect 42: An apparatus for wireless communication, comprising at least one means for performing the method of one or more Aspects of Aspects 1-20.

Aspect 43: A non-transitory computer-readable medium storing code for wireless communication, the code comprising instructions executable by a processor to perform the method of one or more Aspects of Aspects 1-20.

Aspect 44: A non-transitory computer-readable medium storing a set of instructions for wireless communication, the set of instructions comprising one or more instructions that, when executed by one or more processors of a device, cause the device to perform the method of one or more Aspects of Aspects 1-20.

Aspect 45: An apparatus for wireless communication at a device, comprising a processor; memory coupled with the processor; and instructions stored in the memory and executable by the processor to cause the apparatus to perform the method of one or more Aspects of Aspects 21-39.

Aspect 46: A device for wireless communication, comprising a memory and one or more processors coupled to the memory, the memory and the one or more processors configured to perform the method of one or more Aspects of Aspects 21-39.

Aspect 47: An apparatus for wireless communication, comprising at least one means for performing the method of one or more Aspects of Aspects 21-39.

Aspect 48: A non-transitory computer-readable medium storing code for wireless communication, the code comprising instructions executable by a processor to perform the method of one or more Aspects of Aspects 21-39.

Aspect 49: A non-transitory computer-readable medium storing a set of instructions for wireless communication, the set of instructions comprising one or more instructions that, when executed by one or more processors of a device, cause the device to perform the method of one or more Aspects of Aspects 21-39.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure, and wherein all RACH occasions corresponding to the one or more downlink reference signals occur before a set of random access response (RAR) windows corresponding to those RACH occasions;
transmitting one or more first random access messages in one or more corresponding RACH occasions associated with one or more PCIs of the multiple PCIs; and
receiving one or more second random access messages, that include a physical downlink control channel (PDCCH) portion and a physical downlink shared channel (PDSCH) portion, associated with the one or more PCIs based at least in part on transmitting the one or more first random access messages, wherein different RAR windows in the set of RAR windows include PDCCH monitoring occasions associated with different PCIs of the multiple PCIs.

2. The method of claim 1, wherein the indication further indicates a beam sweeping pattern, for the one or more downlink reference signals, that indicates the association between the one or more downlink reference signals and the corresponding one or more PCIs of the multiple PCIs associated with the serving cell.

3. The method of claim 1, wherein a first downlink reference signal included in the one or more downlink reference signals is associated with a first PCI of the serving cell and a second downlink reference signal included in the one or more downlink reference signals is associated with a second PCI of the serving cell.

4. The method of claim 1, wherein each downlink reference signal, in the one or more downlink reference signals, corresponds to a particular PCI of the multiple PCIs associated with the serving cell.

5. The method of claim 1, wherein the indication is received in a radio resource configuration message for contention-free random access, a PDCCH order message that triggers the RACH procedure, or a combination thereof.

6. The method of claim 1, wherein the indication further indicates an association between one or more PDCCH monitoring occasions, of a set of PDCCH monitoring occasions used for the RACH procedure, and a PCI of the multiple PCIs associated with the serving cell.

7. The method of claim 6, wherein a first PDCCH monitoring occasion included in the set of PDCCH monitoring occasions is associated with a first PCI of the serving cell and a second PDCCH monitoring occasion included in the set of PDCCH monitoring occasions is associated with a second PCI of the serving cell.

8. The method of claim 1, further comprising monitoring one or more PDCCH occasions for the PDCCH portion of the one or more second random access messages, wherein the one or more PDCCH occasions correspond to a PCI associated with the one or more corresponding RACH occasions in which the one or more first random access message are transmitted.

9. The method of claim 8, further comprising receiving a PDCCH portion of a second random access message of the one or more second random access messages based at least in part on monitoring the one or more PDCCH occasions, wherein the PDCCH portion of the second random access message includes scheduling information for at least one of a PDSCH portion of the second random access message, one or more subsequent random access messages, or a combination thereof.

10. The method of claim 8, further comprising receiving a PDCCH portion of a second random access message of the one or more second random access messages based at least in part on monitoring the one or more PDCCH occasions, wherein the PDCCH portion of the second random access message indicates a different association between PCIs of the multiple PCIs and at least one of a PDSCH portion of the second random access message, one or more subsequent random access messages, or a combination thereof.

11. The method of claim 1, wherein the multiple PCIs are included in a same timing advance group.

12. The method of claim 1, wherein different PCIs, included in the multiple PCIs, are associated with different timing advance groups.

13. The method of claim 1, wherein the multiple PCIs are included in a same timing advance group or in different timing advance groups based at least in part on a purpose of the RACH procedure.

14. The method of claim 1, further comprising applying a timing advance value received in a second random access message, of the one or more second random access messages, to all PCIs included in a timing advance group that includes a PCI associated with the second random access message.

15. The method of claim 1, wherein the multiple PCIs are associated with co-located base stations or transmit receive points.

16. The method of claim 1, wherein different PCIs, included in the multiple PCIs, are associated with base stations or transmit receive points in different locations.

17. The method of claim 1, wherein the one or more downlink reference signals includes at least one of a set of synchronization signal blocks, a set of channel state information reference signals, or a combination thereof.

18. A user equipment (UE) for wireless communication, comprising:
  a memory; and
  one or more processors coupled to the memory, the one or more processors configured to:
    receive an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure, and wherein all RACH occasions corresponding to the one or more downlink reference signals occur before a set of random access response (RAR) windows corresponding to those RACH occasions;
    transmit one or more first random access messages in one or more corresponding RACH occasions associated with one or more PCIs of the multiple PCIs; and
    receive one or more second random access messages, that include a physical downlink control channel (PDCCH) portion and a physical downlink shared channel (PDSCH) portion, associated with the one or more PCIs based at least in part on transmitting the one or more first random access messages, wherein different RAR windows in the set of RAR windows include PDCCH monitoring occasions associated with different PCIs of the multiple PCIs.

19. The UE of claim 18, wherein the indication further indicates a beam sweeping pattern, for the one or more downlink reference signals, that indicates the association between the one or more downlink reference signals and the corresponding one or more PCIs of the multiple PCIs associated with the serving cell.

20. The UE of claim 18, wherein the indication further indicates an association between one or more PDCCH monitoring occasions, of a set of PDCCH monitoring occasions used for the RACH procedure, and a PCI of the multiple PCIs associated with the serving cell.

21. The UE of claim 18, wherein the one or more processors are further configured to monitor one or more PDCCH occasions for the PDCCH portion of the one or more second random access messages, wherein the one or more PDCCH occasions correspond to a PCI associated with the one or more corresponding RACH occasions in which the one or more first random access message are transmitted.

22. The UE of claim 18, wherein the multiple PCIs are included in a same timing advance group or in different timing advance groups based at least in part on a purpose of the RACH procedure.

23. The UE of claim 18, wherein a first downlink reference signal included in the one or more downlink reference signals is associated with a first PCI of the serving cell and a second downlink reference signal included in the one or more downlink reference signals is associated with a second PCI of the serving cell.

24. The UE of claim 18, wherein each downlink reference signal, in the one or more downlink reference signals, corresponds to a particular PCI of the multiple PCIs associated with the serving cell.

25. The UE of claim 18, wherein the indication is received in a radio resource configuration message for contention-free random access, a PDCCH order message that triggers the RACH procedure, or a combination thereof.

26. The UE of claim 18, wherein the one or more processors are further configured to apply a timing advance value received in a second random access message, of the one or more second random access messages, to all PCIs included in a timing advance group that includes a PCI associated with the second random access message.

27. The UE of claim 18, wherein the multiple PCIs are associated with co-located base stations or transmit receive points.

28. The UE of claim 18, wherein different PCIs, included in the multiple PCIs, are associated with base stations or transmit receive points in different locations.

29. A non-transitory computer-readable medium storing one or more instructions for wireless communication, the one or more instructions comprising:
  one or more instructions that, when executed by one or more processors of a user equipment (UE), cause the one or more processors to:
    receive an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure, and wherein all RACH occasions corresponding to the one or more downlink reference signals occur before a set of random access response (RAR) windows corresponding to those RACH occasions;
    transmit one or more first random access messages in one or more corresponding RACH occasions associated with one or more PCIs of the multiple PCIs; and
    receive one or more second random access messages, that include a physical downlink control channel (PDCCH) portion and a physical downlink shared channel (PDSCH) portion, associated with the one or more PCIs based at least in part on transmitting the one or more first random access messages, wherein different RAR windows in the set of RAR windows include PDCCH monitoring occasions associated with different PCIs of the multiple PCIs.

30. An apparatus for wireless communication, comprising:
  means for receiving an indication of an association between one or more downlink reference signals and a corresponding physical cell identifier (PCI) of multiple PCIs associated with a serving cell, wherein the one or more downlink reference signals are used to identify one or more beams associated with one or more random access channel (RACH) occasions for a RACH procedure, and wherein all RACH occasions corresponding to the one or more downlink reference signals occur before a set of random access response (RAR) windows corresponding to those RACH occasions;
  means for transmitting one or more first random access messages in one or more corresponding RACH occasions associated with one or more PCIs of the multiple PCIs; and
  means for receiving one or more second random access messages, that include a physical downlink control channel (PDCCH) portion and a physical downlink shared channel (PDSCH) portion, associated with the one or more PCIs based at least in part on transmitting the one or more first random access messages, wherein different RAR windows in the set of RAR windows include PDCCH monitoring occasions associated with different PCIs of the multiple PCIs.

* * * * *